US009240973B2

(12) United States Patent
Lee et al.

(10) Patent No.: US 9,240,973 B2
(45) Date of Patent: Jan. 19, 2016

(54) SELF-CONSTRUCTION SYSTEM OF WIRELESS SENSOR NETWORK AND METHOD FOR SELF-CONSTRUCTION OF WIRELESS SENSOR NETWORK USING THE SAME

(75) Inventors: Yong-Hwan Lee, Seoul (KR); Hyung Sin Kim, Seoul (KR); Seung Hwan Lee, Anyang-si (KR)

(73) Assignee: SNU R&DB Foundation, Seoul (KR)

( * ) Notice: Subject to any disclaimer, the term of this patent is extended or adjusted under 35 U.S.C. 154(b) by 99 days.

(21) Appl. No.: 14/001,033

(22) PCT Filed: Jan. 19, 2012

(86) PCT No.: PCT/KR2012/000484
§ 371 (c)(1),
(2), (4) Date: Nov. 5, 2013

(87) PCT Pub. No.: WO2012/115353
PCT Pub. Date: Aug. 30, 2012

(65) Prior Publication Data
US 2015/0036545 A1    Feb. 5, 2015

(30) Foreign Application Priority Data
Feb. 22, 2011    (KR) .......................... 10-2011-0015589

(51) Int. Cl.
*H04L 29/12*    (2006.01)
*H04L 12/753*   (2013.01)
*H04W 40/24*    (2009.01)
*H04L 12/751*   (2013.01)
(Continued)

(52) U.S. Cl.
CPC ............ *H04L 61/2038* (2013.01); *H04L 45/48* (2013.01); *H04W 40/246* (2013.01); *H04L 45/02* (2013.01); *H04W 84/18* (2013.01); *H04W 84/20* (2013.01)

(58) Field of Classification Search
CPC ... H04L 29/12; H04L 12/753; H04L 61/2038; H04L 45/48; H04L 12/44; H04L 2012/44; H04L 45/02; H04L 45/00; H04L 12/00; H04W 40/24; H04W 40/426; H04W 84/18
See application file for complete search history.

(56) References Cited

U.S. PATENT DOCUMENTS

| 2,006,651 | A  | * | 7/1935 | Perichard ........................ 242/149 |
| 7,961,651 | B2 | * | 6/2011 | Kim et al. ...................... 370/256 |
| 2001/0007559 | A1 | * | 7/2001 | Le Pennec et al. ........... 370/392 |

(Continued)

FOREIGN PATENT DOCUMENTS

| KR | 1020060045844 A | 5/2006 |
| KR | 100746471 B1    | 8/2007 |

(Continued)

*Primary Examiner* — Warner Wong
(74) *Attorney, Agent, or Firm* — The Webb Law Firm

(57) ABSTRACT

Disclosed is a self-construction system of a wireless sensor network, and a method for self-construction of a wireless sensor network using the same. Also disclosed is a method for self-construction of a cluster tree structure-based wireless sensor network (WSN). The present invention can connect devices distributed densely in a wide area to a network while maintaining the advantages of a conventional tree-structured network, such as the reduction of time required for network construction, traffic by the exchange of control command messages, and a load for a routing path search, and thus can provide a WSN having an improved self-construction performance.

18 Claims, 16 Drawing Sheets

(51) Int. Cl.
*H04W 84/20* (2009.01)
*H04W 84/18* (2009.01)

(56) References Cited

U.S. PATENT DOCUMENTS

| | | | |
|---|---|---|---|
| 2003/0151513 A1* | 8/2003 | Herrmann et al. | 340/573.1 |
| 2005/0122231 A1* | 6/2005 | Varaiya et al. | 340/870.01 |
| 2005/0135275 A1* | 6/2005 | Hester et al. | 370/256 |
| 2006/0128349 A1* | 6/2006 | Yoon | 455/343.2 |
| 2009/0113232 A1* | 4/2009 | Park et al. | 714/2 |
| 2009/0322518 A1* | 12/2009 | Liang et al. | 340/539.18 |
| 2010/0260071 A1* | 10/2010 | Lai et al. | 370/256 |
| 2011/0051645 A1* | 3/2011 | Hong et al. | 370/311 |
| 2011/0216673 A1* | 9/2011 | Hasegawa et al. | 370/256 |

FOREIGN PATENT DOCUMENTS

| | | |
|---|---|---|
| KR | 1020100006843 A | 1/2010 |
| KR | 100952075 B1 | 4/2010 |
| KR | 100969943 B1 | 7/2010 |

\* cited by examiner

SELF-CONSTRUCTION SYSTEM OF WIRELESS SENSOR NETWORK AND METHOD FOR SELF-CONSTRUCTION OF WIRELESS SENSOR NETWORK USING THE SAME

CROSS-REFERENCE TO RELATED APPLICATIONS

This application is the U.S. national phase of International Application No. PCT/KR2012/000484 filed Jan. 19, 2012, and claims priority to Korean Patent Application No. 10-2011-0015589 filed Feb. 22, 2011, the disclosures of which are hereby incorporated by reference in their entirety.

TECHNICAL FIELD

The present invention relates to a self-construction system of a wireless sensor network, and a method for self-construction of a wireless sensor network using the same, and more particularly, to a system for self-construction of a large-scale, high-density wireless sensor network in a cluster tree structure and a method for self-construction of a large-scale, high-density wireless network using the same.

BACKGROUND ART

In recent years, since a micro electro mechanical system (MEMS) based sensor technique, a low-power analog and digital electronic technique, a low-power RF design technique, and the like have been rapidly developed, a network technique using comparatively low-cost, low-power type wireless sensors have been actively developed.

Since self-construction in wireless sensor networks (hereinafter, referred to as WSN) as a very important technique for construction of a large-scale network comprising a large number of sub systems can be generally used for improving network extensibility and dynamically adapting to a change in environmental condition, it plays a very important role in a communication system.

Cluster-based self-construction in the WSN segments an entire network by the cluster unit to present a networkbased structure for easy control and uses a hierarchical approach that divides an entire WSN into cluster classes, and respective sensor nodes form one cluster around one cluster head and segment the entire network by the cluster unit. A cluster head of each cluster serves to route data which are acquired, collected, and merged in each cluster, to a cluster head of another cluster or a base station.

The process of self-construction of the WSN generally comprises three steps, that is, a network structure determination step of determining the construction of the network, a network connection step of connecting devices and extending the network according to the determined network structure, and a data transmission step in which the connected devices transmit and receive signals to and from each other. When the devices of the WSN access to the network, they are granted with their own unique addresses to recognize each other by the address, data transmission and reception between intra-cluster devices comprising one parent device and a plurality of child devices are performed within the same superframe duration, and devices which are far from each other transmit and receive data through multi-hops due to limitation of a transmission distance of the device. Therefore, a unique address is allocated to each device for self-construction of a large-scale WSN, the superframe duration used by each cluster is independently allocated in order to prevent cluster-to-cluster interference, and it is essential to search for a routing path for multi-hop transmission.

A balanced-tree based WSN self-construction process of Zigbee which is a representative WSN system can be described in what follows. First, the network structure determination step makes a coordinator that controls the entire network construct a balanced-tree based network according to a maximum network depth, the maximum number of child devices, the maximum number of child routers, and the like. Thereafter, in the network connection step, each device determines all routers within a communication range as a parent candidate group, and selects a router in which a network depth is smallest among the routers as a parent, and as a result, a full function device requests subscription as a router and a reduced function device requests subscription as an end device. The router assigned as the parent determines whether to accept the device that requests the subscription by itself in consideration of the maximum number of child devices and the maximum number of child routers and thereafter, directly allocates addresses to the devices exploiting a balanced-tree structure, establishing the parent and child relationship. In this case, to determine the balanced-tree structure, each parent device transmits a beacon signal containing parameters including the maximum network depth, the maximum number of child devices, the maximum number of child routers, allowing the child devices to share the balanced-tree structure.

When a specific device cannot make a subscription to any of all neighboring routers, it recognizes network subscription failure and becomes an orphan device, and when the full function device cannot make subscription to the network as a router, it re-tries to make subscription to the network as an end device.

Finally, devices connected to the network can transmit data by means of hierarchical routing associated with the balanced-tree structure in the data transmission step.

Zigbee can make self-construction of a balanced-tree based WSN while providing advantages of using reduced time and traffic for exchange of control command messages in the network construction, and requiring no additional search for routing path in a tree based hierarchical routing, but it may have problems in that the network depth is limited due to a characteristic of a balanced-tree in which the size of the tree structure is exponentially increased according to the network depth and the number of useless addresses is increased as the formed WSN is enlarged because the balanced-tree structure is determined without considering operating environments. Further, since the full function device that can the router or the end device requests subscription as a router until subscription of the full function device is rejected by all neighboring parent candidates, the routers are concentrated at the vicinity of the coordinator, and as a result, it is difficult to extend the network far even though the network depth is increased. Moreover, since a channel is saturated and thus the clusters cannot have an independent superframe when the density of devices is high due to a constraint condition in which an entire network uses a single channel, connectivity of the network is significantly degraded due to cluster-to-cluster interference.

DISCLOSURE

Technical Problem

The present invention is contrived to solve the problems of the related art and to solve a problem in which a network depth is limited due to a characteristic in which the size of a tree structure is exponentially increased according to the network depth in a balanced-tree based WSN and a problem in which the number of useless addresses of a WSN formed by determining the balanced-tree structure without considering an operating environment of a network is increased.

Further, the present invention may alleviate a problem that the full function devices may be heavily located near the coordinator, which may hamper the network expansion even with the increase of the network depth, since a full function devices which can be a router or an end device tries to make subscription as a router until it cannot make subscription to any of all parent candidates.

Moreover, the present invention may alleviate a problem that the network connectivity is significantly degraded due to the interference among clusters, since a channel is fully utilized and thus clusters cannot have their superframe independent of each other when the network density is high and the entire network uses a single channel.

Technical Solution

In order to achieve the objects, a method for self-construction of a cluster tree structure based wireless sensor network (WSN) includes: (A) a network structure determination step of calculating, by a coordinator, which is one of parent devices, a minimum network depth for covering up the entire area of the WSN and the number of devices located within a communication range, and calculating the maximum number of child router devices and the maximum number of child end devices according to a network depth in each tree step to determine a network structure; (B) a network construction step of selecting, by the parent device in each tree step, the device as a child device with address allocation in response to a subscription request of a device as a child device, and allocating a superframe duration to a child router device among the child devices; and (C) a data transmission step of searching for, by a router device having data packets, a routing path by means of address comparison between its own address and a final destination address of the packet, and transmitting the packet according to the routing path.

Preferably, step (A) may include: (A-1) calculating an average communication range and calculating the minimum network depth based on the average communication range; (A-2) calculating the number of devices located within the average communication range based on the average communication range and the minimum network depth; (A-3) determining a maximum network depth and the number of tree steps; and (A-4) calculating the maximum number of child router devices and the maximum number of child end devices according to the network depth in each tree step.

More preferably, in step (A-3), the maximum network depth may be set as the minimum network depth and the number of tree steps may be input from a user or set to a previously determined value, and in step (A-4), a tree threshold depth may be determined for each tree step, and a structure for each tree step may be determined by calculating the maximum number of child router devices and the maximum number of child end devices in each tree step in consideration of the maximum network depth and the tree threshold depth.

Preferably, step (B) may include (B-1) selecting, by a child device, a parent candidate group, selecting a parent device in consideration of a network depth and a transmission link quality (LQ) of parent devices in the parent device candidate group, and requesting subscription to the selected parent device as a child device; (B-2) selecting, by the selected parent device, a child device that requests subscription in consideration of the number of its child devices and allowing the selected child device to subscribe as its child device; (B-3) allocating, by the selected parent device, an address to the selected child device; and (B-4) allocating, by the selected parent device, a superframe duration to child router devices among its child devices with allocated address.

Herein, when the child device is selected as a child router device, step (B-1) may further include estimating, by the child device, the transmission link quality (LQ) from reception characteristics of a received beacon signal and initializing a parent device candidate group comprising routers whose transmission link quality (LQ) is larger than a threshold value; determining the parent device candidate group in consideration of the network depth of parent devices in the parent candidate group; selecting a parent device which has the lowest transmission link quality (LQ) in the parent device candidate set; and transmitting to the selected parent device a subscription request message including the number of parent devices in the parent device candidate group.

Further, when the child device is selected as the child router device, step (B-2) may further include initializing, by the selected parent device, its child router candidate group comprising devices that request subscription as its child router; selecting a child router device which has the highest transmission link quality (LQ) among child router devices in the child router candidate group when the selected parent device is the coordinator, and selecting a child router device which has the smallest number of the parent devices in the parent candidate group among child router devices in the child router candidate group when the selected parent device is the router; adding the selected child router device to its child router group in subscription; and confirming the subscription of the selected child router device in consideration of the number of child routers in the child router group and the maximum allowable number of child routers.

Herein, when the child device is selected as a child end device, step (B-1) may further include estimating, by the child device, the transmission link quality (LQ) based on reception characteristics of a received beacon signal and initializing a parent device candidate group comprising routers whose estimated transmission link quality (LQ) is larger than a threshold value; determining parent devices belonging to the parent device candidate group in consideration of their network depth; selecting a parent device which has the largest transmission link quality (LQ) in the parent device candidate group; and transmitting a subscription request message to the selected parent device.

Further, when the child device is selected as the child end device, in step (B-2), the selected parent device may confirm the subscription of child end devices in a first-come-first-service manner in consideration of the maximum allowable number of child end devices which is equal to the difference between the maximum allowable number of child devices and the maximum allowable number of child router devices.

In addition, when a device requesting subscription as a child router device is rejected by all of the parent devices in the parent candidate group as a result of performing step (B-2), it performs step (B-1) as a child end device again.

Preferably, step (B-3) may include calculating, by the selected parent device, the maximum allowable number of child devices to be subscribed in its lower hierarchical tree steps; allocating its child router devices their address each of which is separated at a space of the maximum allowable number of their descendent child devices; and allocating the address to its child end devices by increasing one by one from the largest address that its child routers use.

Preferably, step (B-4) may include (B-4-a1) estimating, by the selected parent device and the child router device, the availability of a channel selected by the selected parent device by means of channel sensing; (B-4-a2) generating, by the selected parent device, information on candidate superframe duration available in the estimated channel; (B-4-a3) transmitting, by the selected parent device, the information on candidate superframe duration to the child router device; (B-4-a4) determining, by the child router device, a superframe duration among candidate superframe durations in consideration of the received information on candidate superframe duration and available superframe duration estimated by itself; (B-4-a5) transmitting, by the child router device, information on the determined superframe duration to the selected parent device; and (B-4-a6) determining the superframe duration to be used by the selected parent device and the child router device.

Further, step (B-4-a4) may include comparing, by the child router device, the received information on candidate superframe duration and its estimated available superframe duration, and transmitting to the selected parent device a failure message on the selection of superframe duration when no superframe duration is available; and repeating, by the selected parent device, step (B-4-a1) through channel sensing on a different channel when the failure message is received.

In addition, step (B-4) may include (B-4-b1) estimating, by the selected parent device and the child router device, the availability of a channel selected by the selected parent device by means of channel sensing; (B-4-b2) generating, by the child router device, information on candidate superframe duration available in the estimated channel; (B-4-b3) transmitting, by the child router device, the information on candidate superframe duration to the selected parent device; (B-4-b4) determining, by the selected parent device, a superframe duration among candidate superframe durations in consideration of the received information on candidate superframe duration and available superframe duration estimated by itself; (B-4-b5) transmitting, by the selected parent device, the determined superframe duration information to the child router device; and (B-4-b6) determining the superframe duration to be used by the selected parent device and the child router device.

Furthermore, step (B-4-b4) may include comparing, by the selected parent device, the received information on candidate superframe duration and available superframe duration estimated by itself, and transmitting to the child router device a failure message on the selection of superframe duration when no superframe duration is available; and repeating, by the selected parent device, step (B-4-a1) through channel sensing on a different channel when the failure message is received.

Preferably, step (C) may include: receiving, by the router device having the packet, the packet when the address of the router device having the packet is the same as the final destination address of the packet;

transmitting the packet to its child devices when the final destination address of the packet is larger than its address and smaller than its address plus its maximum allowable number of child devices; and returning the packet to its parent device when the final destination address of the packet is smaller than its address or larger than its address plus its maximum allowable number of child devices.

In addition, a system for self-construction of a cluster tree structure based wireless sensor network (WSN) includes: a coordinator calculating an average communication range of the WSN and the number of devices located within the average communication range and calculating the maximum allowable number of child routers and child devices in each tree step based on the average communication range and the number of devices within the average communication range to determine a multi-step tree network structure; parent devices selecting their child devices through a subscription request from devices belonging to a lower tree step, and allocating selecting its child devices to their selected child devices addresses; and child devices making network access with address allocation by means of subscription to a parent device belonging to an upper tree step through a subscription request process.

Preferably, the coordinator may include: an operating environment estimating unit calculating an average communication range and the number of devices located within the average communication range; and a multi-step balanced-tree structure optimizing unit calculating a maximum network depth, and the maximum allowable number of child routers and the maximum allowable number of child devices in each tree step.

Further, the parent device may include: a child router selecting unit determining its child router devices among devices that request network subscription as a child router and managing its child router devices; a child end device selecting unit determining its child end devices among devices that request network subscription as a child end device and managing its child router devices; and a multi-step tree based address allocating unit allocating an address to a selected child device, transmitting the allocated address to the selected child devices, and allocating a superframe duration to its child router devices.

In addition, the child devices include child router devices and child end devices, the child router device may include a router parent selecting unit that selects a parent device candidate group, selects a parent device in the parent device candidate group, and requests network subscription to the selected parent device, and the child end device includes an end device parent selecting unit that selects a parent device candidate group, selects the parent device from the parent device candidate group, and requests network subscription to the selected parent device.

Preferably, the coordinator, the parent device, and the child router device may include a multi-step tree based hierarchical routing unit that searches for a routing path for transmitting a packet as router devices.

Advantageous Effects

According to the present invention, an operating environment estimating unit of a coordinator estimates a minimum network depth and the number of devices located within a communication range, and a multi-step tree structure determining unit optimizes a multi-step tree in accordance with an actual device installation environment based thereon to design a network structure capable of connecting all devices while minimizing a routing delay.

Further, according to the present invention, routers are guided to be prevented from being concentrated on a specific direction and be evenly distributed in a wide area to maximize network connectivity and transmission performance.

In addition, the network connectivity of an end device is improved and a transmission link quality (LQ) between the parent router and the child end device after network connection is ensured through an end device parent selecting unit of a child end device and a child end device selecting unit of a parent device according to the present invention to thereby improve device-to-device data transmission performance.

In a multi-step tree based address allocating process according to the present invention, each parent device calculates the maximum number of devices to be subscribed to its own lower hierarchy tree step based on the multi-step tree structure factor determined in the network structure determining process and determines its own available address based on the maximum number of devices to assure independency of an address while the parent device directly allocates the address without separate message exchange.

Further, in the present invention, each of the parent device and the child router device searches for the channel state and thereafter, the child router device finally selects the superframe duration with respect to the superframe duration candidate information presented by the parent device or the parent device finally selects the superframe duration with respect to the superframe duration candidate information presented by the child router device, and as a result, the channel available state information of the parent device and the channel available state information of the child router device are efficiently combined to allocate the superframe duration, and unlike the existing Zigbee using a single channel, since the child router device uses a different channel from the parent device to allocate the superframe duration and operate its own cluster, each cluster ensures an independent superframe duration to connect the network without cluster-to-cluster interference even under an environment in which the devices are distributed with high density.

In addition, in the present invention, since a routing path of a packet is determined based on a multi-step tree determined according to the network structure determining process, a plurality of devices installed in the wide area with high density may be rapidly self-constructed while minimizing the message exchange, a burden of searching for the routing path, and the routing delay.

As such, according to the present invention, numeral devices selected with high density in the wide area are connected to the network while the message exchange caused during the process of self-construction of the WSN to thereby effectively improve large-scale WSN self-construction performance.

BEST MODE

The present invention relates to a system for self-construction of a large-scale, high-density wireless sensor network in a cluster tree structure and a method for self-construction of a large-scale, high-density wireless sensor network using the same.

Figure 1:
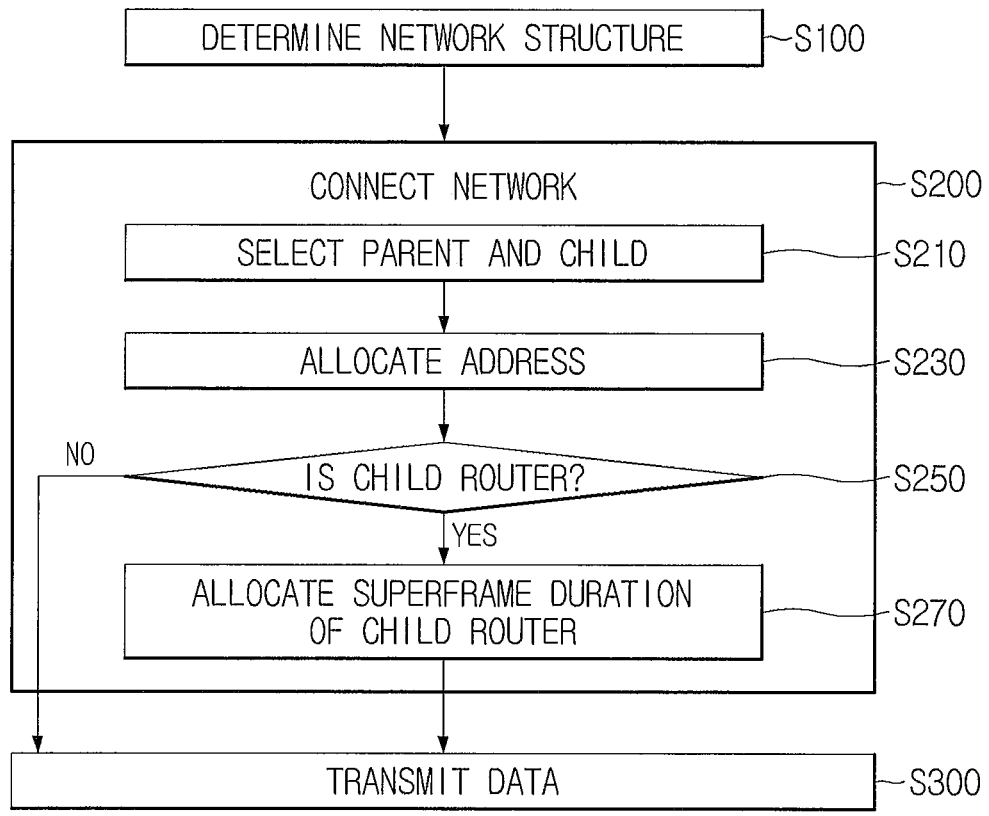
FIG. 1 illustrates a schematic flowchart of a method for self-construction of a wireless sensor network according to the present invention.

FIG. 1 illustrates a schematic flowchart of a method for self-construction of a wireless sensor network according to the present invention.

The method for self-construction of a wireless sensor network according to the present invention will be schematically described with reference to FIG. 1. First, a network structure is determined (S100) and a network is connected based on the determined structure (S200), and in a process of connecting the network (S200), a parent device and a child device are selected from respective devices included in the network (S210) and addresses are allocated to the respective selected devices (S230) and thereafter, it is judged whether the selected child device is a router (S250) and when the selected child device is the router, a superframe duration is allocated to the child router device (S270). When such a process ends, data is transmitted within the connected network (S300).

MODE FOR INVENTION

The present invention, operational advantages of the present invention, and objects achieved by executing the present invention will be, hereinafter, described by exemplifying exemplary embodiments of the present invention and referring to the exemplified exemplary embodiments.

First, terms used in the present application are just used to describe a specific exemplary embodiment and do not intend to limit the present invention and a singular expression may include a plural expression as long as it is not apparently contextually different. In this application, terms such as 'include' or 'have' are used to designate presence of features, figures, steps, operations, elements, parts, or combinations thereof disclosed in the specification and it should be understood that presence or addition possibilities of one or more other features or figures, steps, operations, elements, parts, or combinations thereof are not excluded in advance.

In describing the present invention, when it is determined that the detailed description of the known configuration or function related to the present invention may obscure the gist of the present invention, the detailed description thereof will be omitted.

FIG. 2 illustrates a concept of a cluster tree structure based WSN according to the present invention.

Figure 2A:
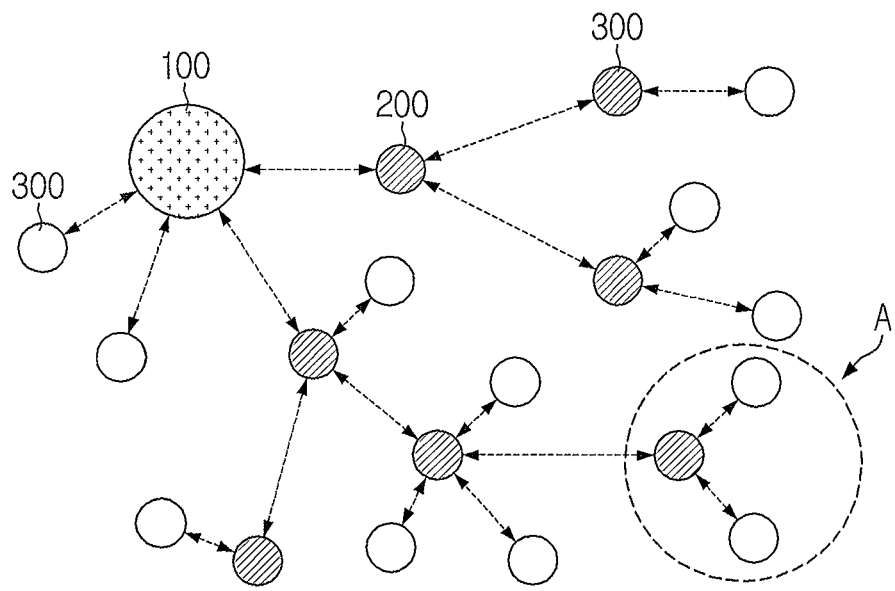
FIGS. 2A-2B illustrate a concept of a cluster tree structure based WSN according to the present invention.
Figure 2B:
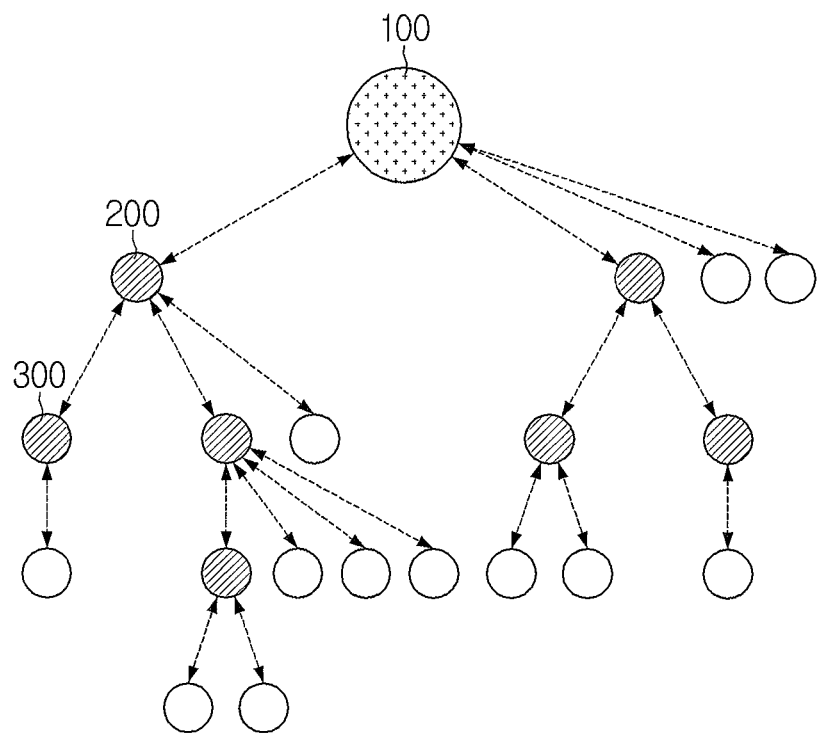

FIG. 2(a) illustrates a physical network structure of a cluster tree structure based WSN and FIG. 2(b) illustrates a logical network structure of the cluster tree structure based WSN.

The present invention is applied to a cluster tree based WSN system in which the respective devices connected to the network are connected to each other with the relationship between a parent device and a child device, one parent device and a plurality of child devices constitute one cluster A, and a plurality of clusters are connected with the parent-child relationship among the routers, so that an entire network is constructed in a tree structure as illustrated in FIG. 2(a) and when this is described in terms of a logical network structure, the present invention may be applied to the cluster tree structure based WSN system having a plurality of hierarchical structures as illustrated in FIG. 1(b).

When a construction of the tree structure based WSN system is described in detail with reference to FIG. 2(b), one device 200 that belongs to the corresponding WSN system becomes a child device with respect to a device 100 located in an upper hierarchy tree step than a tree step to which the one device 200 belongs and to which the subscribes to which the device 200 subscribes and a parent device with respect to a device 300 that is located at a lower hierarchy tree step than a tree step to which the device 200 belongs, and which subscribes to the device 200.

Figure 3A:
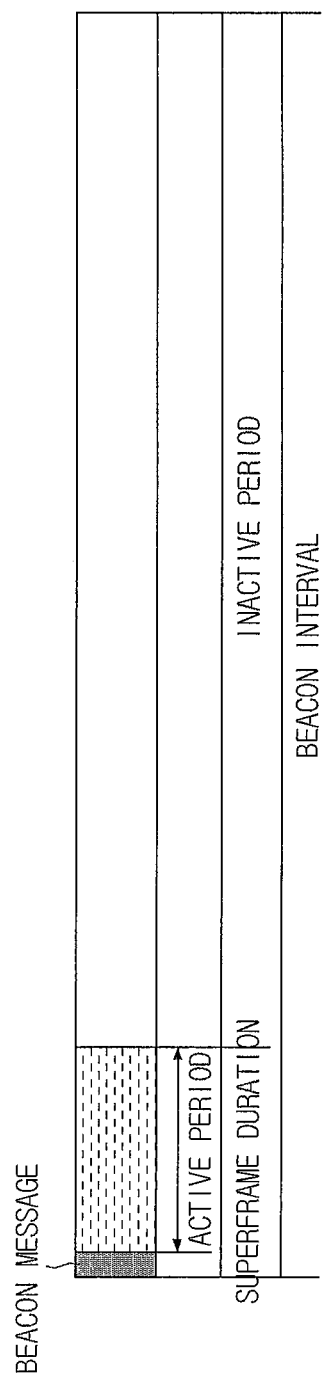
FIGS. 3A-3B illustrate an exemplary embodiment of structures of a channel and a superframe of the WSN according to the present invention.

FIG. 3 illustrates an exemplary embodiment of structures of a channel and a superframe of the WSN according to the present invention. It is assumed that the cluster transmits and receives data during an active period in a superframe duration that starts from a beacon signal transmitted by the parent device and stops transmitting the data before transmitting a subsequent beacon signal after the superframe ends, that is, during an inactive period as illustrated in FIG. 3(a).

Figure 3B:
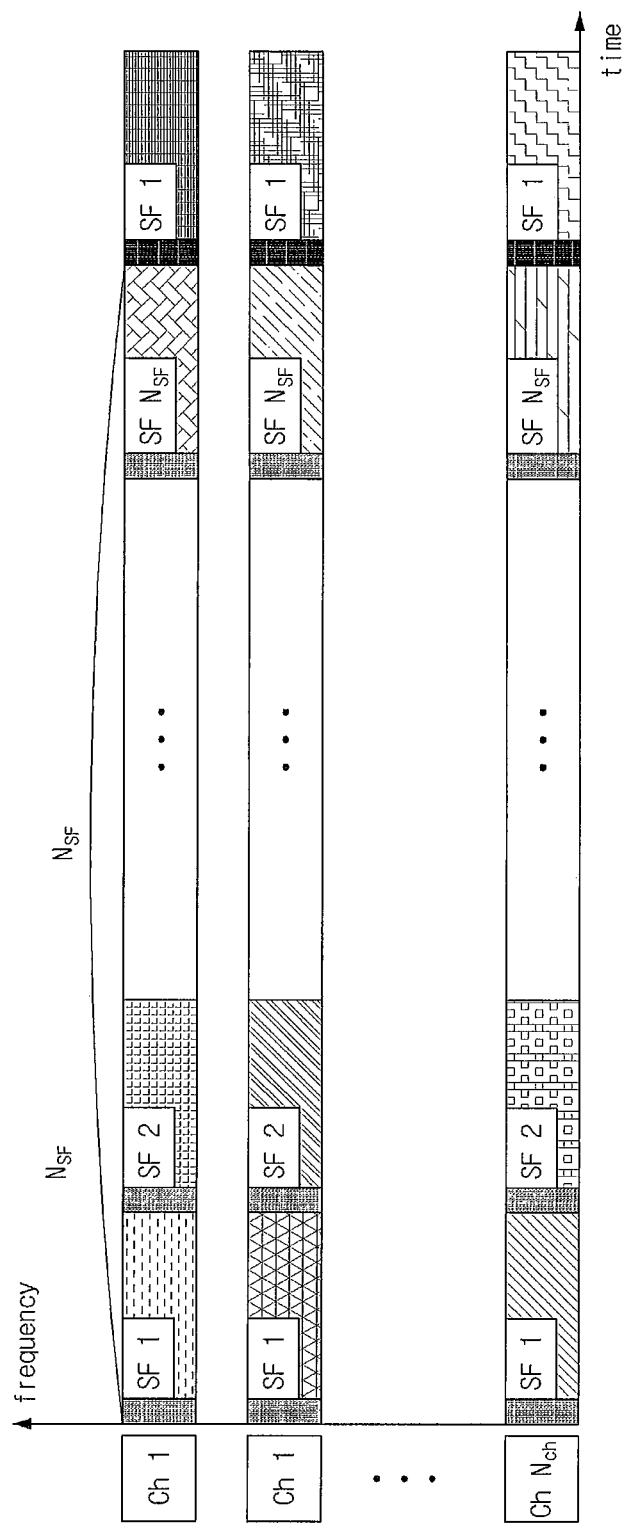

Further, it is assumed that the WSN system may use $N_{ch}$ channels which are not duplicated and each channel may provide $N_{SF}$ non-duplicated superframe durations within one beacon signal interval as illustrated in FIG. 3(b).

In such a case, when $N_{FFD}$ full function devices and $N_{RFD}$ reduced-functioning devices having a communication range (transmission range) of $r_d$ are arbitrarily mixedly installed in a space having an area of S, the density ρ of devices per area may be calculated by [Equation 1] below.

$$\rho = \frac{N_{FFD} + N_{RFD}}{S} \quad \text{[Equation 1]}$$

Figure 4:
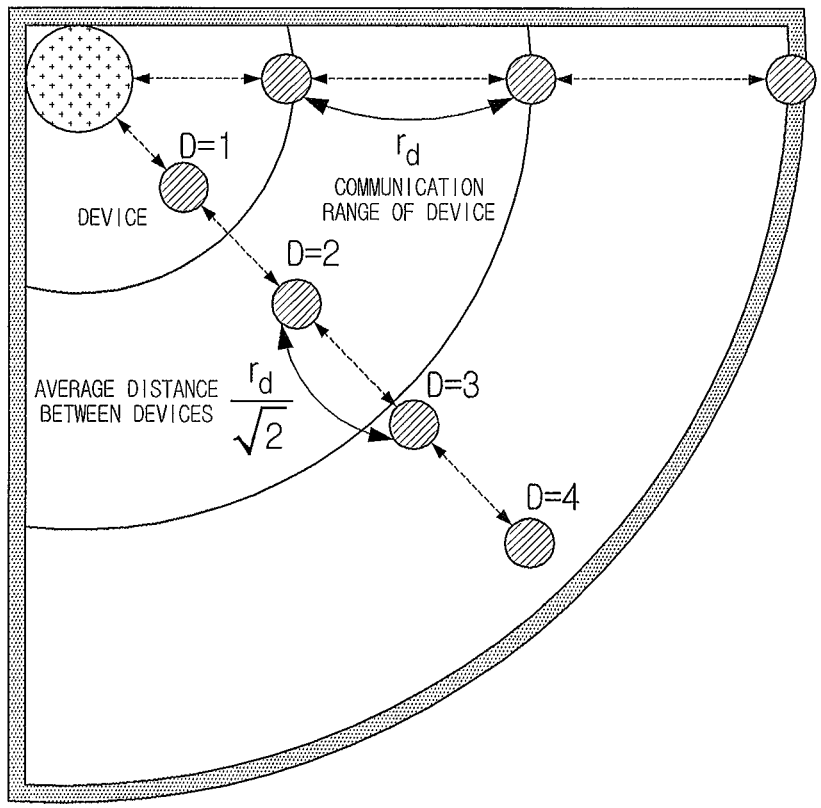
FIG. 4 illustrates an average distance between a communication range and a device located therein in an exemplary embodiment of a WSN system according to the present invention.

FIG. 4 illustrates an average distance between a communication range and a device located therein in an exemplary embodiment of a WSN system according to the present invention and as illustrated in FIG. 4, the communication range of each device is $r_d$, but the devices are arbitrarily distributed, so that an average distance among the respective connected devices may be $r_d/\sqrt{2}$. Therefore, an average transmission range of the WSN calculated from the coordinator may be expressed like [Equation 2] below according to a network depth D.

$$r_n(D) = r_d + \frac{(D-1)r_d}{\sqrt{2}} \quad \text{[Equation 2]}$$

Hereinafter, a system for self-construction of a wireless sensor network according to the present invention and a method for self-construction of a wireless sensor network using the same according to the present invention will be described in more detail with reference to exemplary embodiments of the present invention.

First, a coordinator according to the present invention for determining the network structure (S100) and a process of determining a network structure by using the same according to the present invention will be described.

Figure 5:
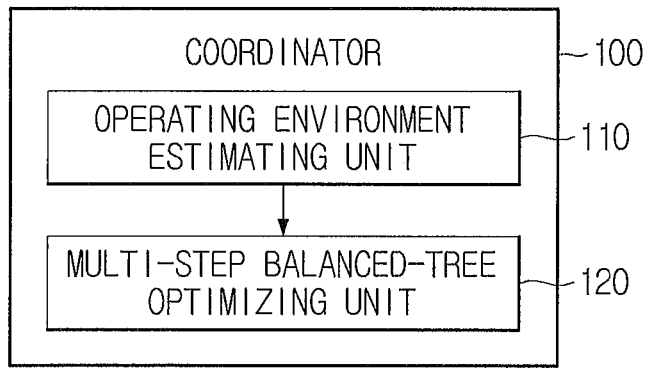
FIG. 5 illustrates an exemplary embodiment of a schematic configuration of a coordinator of a system for self-construction of a wireless sensor network according to the present invention.
Figure 6:
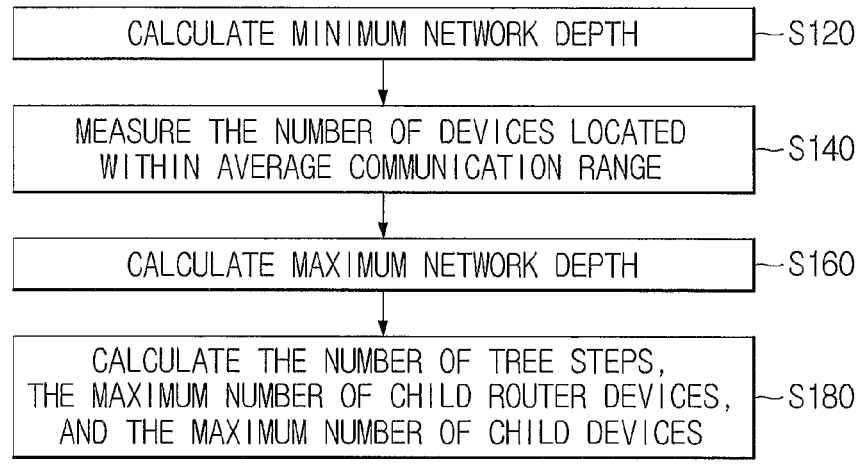
FIG. 6 illustrates a flowchart of an exemplary embodiment of a process of determining a network structure by a coordinator according to the present invention.

FIG. 5 illustrates an exemplary embodiment of a schematic configuration of a coordinator of a system for self-construction of a wireless sensor network according to the present invention. FIG. 6 illustrates a flowchart of an exemplary embodiment of a process of determining a network structure by a coordinator according to the present invention.

In the exemplary embodiment of the present invention, a coordinator 100 performs the process of determining the network structure (S100), and as illustrated in FIG. 5, the coordinator 100 according to the present invention schematically includes an operating environment estimating unit 110 and a multi-step balanced-tree optimizing unit 120. The process of determining the network structure through the coordinator 100 having the aforementioned configuration is described in more detail with reference to FIG. 6. First, the operating environment estimating unit 110 of the coordinator 100 calculates the average communication range $r_n(D)$ of the WSN according to the network depth based on [Equation 2] above, calculates a minimum network depth $D_{min}$ in required for covering up the entire area of the WSN based on the information such as the communication range $r_d$, the average communication range $r_n(D)$, a density of devices per area ρ, an area S, and the like (S120), and estimates the number of devices $N_d(D)$ located within the average communication range $r_n(D)$ of the WSN at the network depth D ($\leq D_{min}$) (S140).

Thereafter, the multi-step balanced-tree optimizing unit 120 of the coordinator 100 determines a maximum network depth $L_m$ so as to minimize a routing delay while covering up the entire area by using the and $D_{min}$ and $N_d(D)$ (S160) and determines the number of tree steps $n_{step}$, and the maximum number of child router devices $R_m(D)$ and the maximum number of child devices $C_m(D)$ according to the D ($\leq L_m$) so as to minimize a difference between the $N_d(D)$ and the number of devices which may be connected in the tree structure at the network depth D (S180) to thereby construct a multi-step tree capable of maximizing connectivity.

Figure 7:
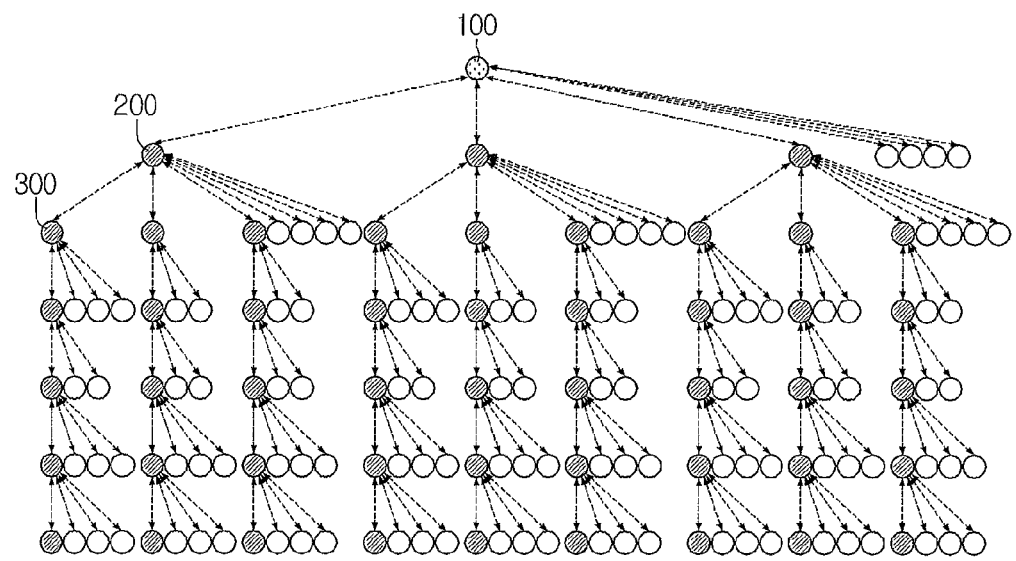
FIG. 7 illustrates an exemplary embodiment of a WSN construction based on a multi-step tree structure.

FIG. 7 illustrates an exemplary embodiment of a WSN construction based on a multi-step tree structure.

In the case of a WSN logical construction based on the multi-step tree structure illustrated in FIG. 7, the coordinator first calculates the average communication range $r_n(D)$ through [Equation 2] above based on the communication range of each device $r_d$, and may estimate a minimum network depth $D_{min}$ required for covering up the entire area of a WSN to be constructed and the number of devices $N_d(D)$ located within the average communication range of WSN $r_n(D)$ at a network depth D ($\leq D_{min}$) as described below by using the information such as $r_d$, $r_n(D)$, $\rho$, S, and the like.

The exemplary embodiment of FIG. 7 will be described by converting the exemplary embodiment having the logical structure of FIG. 7 into an exemplary embodiment having various physical structures as illustrated in FIG. 8 in order to more easily describe the process of self-construction of the WSN by the method for self-construction of the WSN according to the present invention.

Figure 8A:
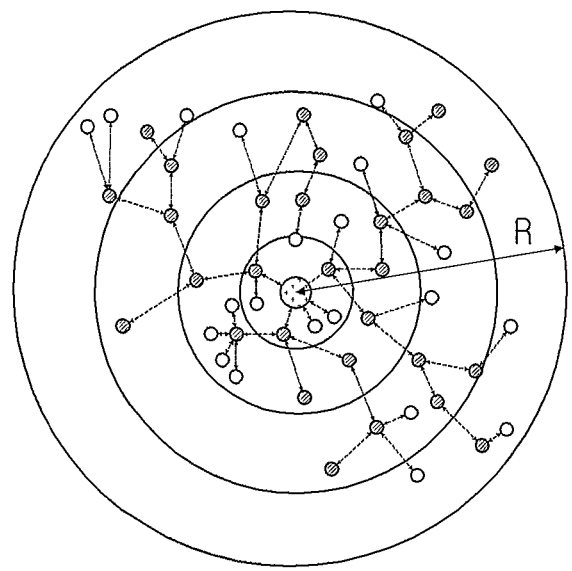
FIGS. 8A-8C illustrate a WSN having various physical structures for a WSN having a logical structure of FIG. 7.
Figure 8B:
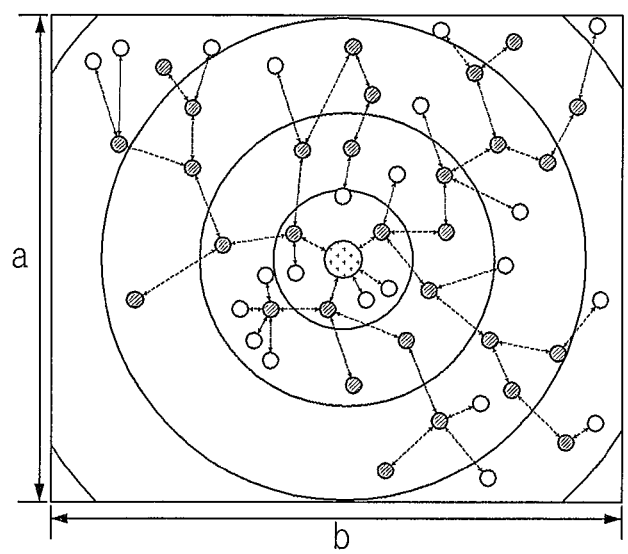
Figure 8C:
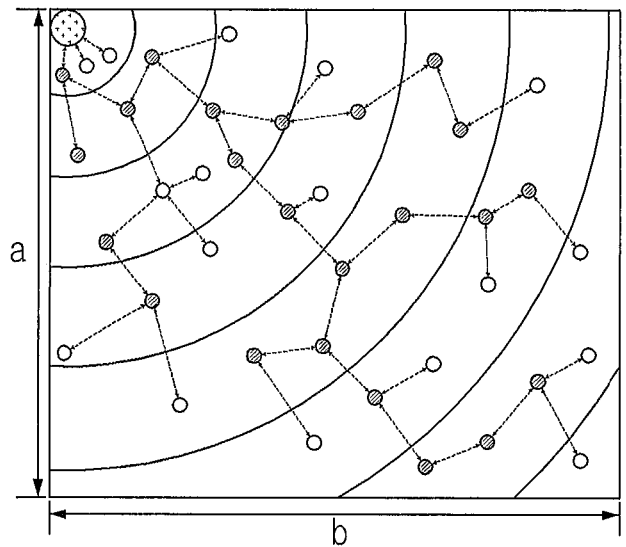

FIG. 8 illustrates a WSN having various physical structures for the WSN having the logical structure of FIG. 7, and FIG. 8(a) illustrates a case in which a space where the WSN is constructed is circular and the coordinator is located at the center of the space, FIG. 8(b) illustrates a case in which the space where the WSN is constructed is quadrangular and the coordinator is located at the center of the space, and FIG. 8(c) illustrates a case in which the space where the WSN is constructed is quadrangular and the coordinator is located at a corner of the space.

The coordinator 100 estimates the minimum network depth and the number of devices for the respective structures in the WSN operating environment of the exemplary embodiment with respect to the physical structure of the WSN of FIG. 8, and FIG. 9 illustrates a flowchart for estimating the minimum network depth and the number of devices according to the present invention with respect to the respective structures for the exemplary embodiment of FIG. 8.

Figure 9A:
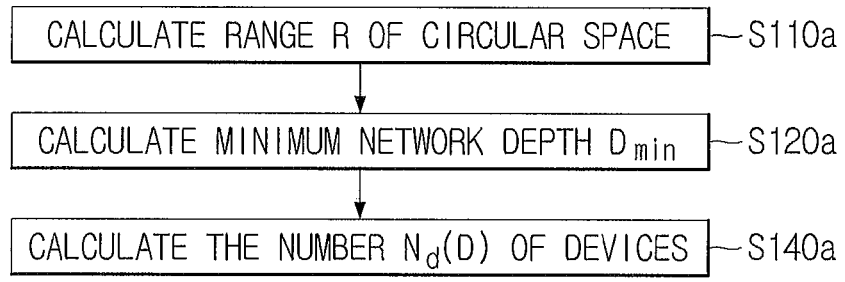
FIGS. 9A-9C illustrate a flowchart estimating a minimum network depth and the number of devices according to the present invention with respect to the respective structures for the exemplary embodiment of FIG. 8.

FIG. 9(a) illustrates a process of estimating the minimum network depth $D_{min}$ and the number of devices $N_d(D)$ in the case in which the space is circular and the coordinator is located at the center, which is illustrated in FIG. 8(a), and the operating environment estimating unit 110 of the coordinator 100 calculates a range of the circular space, R according to [Equation 3] below (S110a) and estimates $D_{min}$ as described in [Equation 4] below (S120a).

$$R = \sqrt{\frac{S}{\pi}} \qquad \text{[Equation 3]}$$

$$D_{min} = \min\{d \mid r_n(D) \geq R\} \qquad \text{[Equation 4]}$$
$$= \left\lceil 1 - \sqrt{2} + \frac{\sqrt{2}\,R}{r_d} \right\rceil$$

Herein, $\lceil x \rceil$ represents a minimum value among integers which are equal to or larger than x. $N_d(D)$ may be estimated as described in [Equation 5] below based thereon (S140a).

$$N_d(D) = \begin{cases} \rho \pi r_n^2(D), & \text{for } D < D_{min} \\ \rho S, & \text{for } D \geq D_{min} \end{cases} \qquad \text{[Equation 5]}$$

Figure 9B:
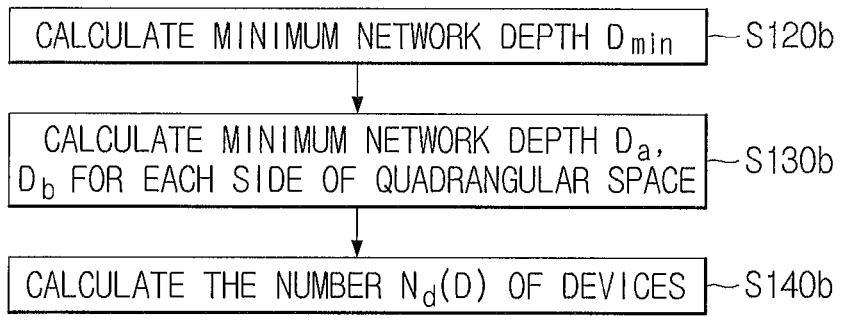

As a next example, FIG. 9(b) illustrates the process of estimating the minimum network depth $D_{min}$ and the number of devices $N_d(D)$ in the case in which the space is quadrangular and the coordinator is located at the center, which is illustrated in FIG. 8(b), and the operating environment estimating unit 110 of the coordinator 100 calculates $D_{min}$ according to [Equation 6] below (S120b).

$$D_{min} = \min\left\{D \,\middle|\, r_n(D) \geq \frac{\sqrt{a^2 + b^2}}{2}\right\} \qquad \text{[Equation 6]}$$
$$= \left\lceil 1 - \sqrt{2} + \frac{\sqrt{a^2 + b^2}}{\sqrt{2}\,r_d} \right\rceil$$

Herein, a and b represent a short-side length and a long-side length of a rectangular space, respectively. As illustrated in FIG. 8(b), extension of the communication range when $r_n(D)$ exceeds a rectangular wall is limited in the quadrangular space. In this case, when the minimum network depth in which $r_n(D)$ exceeds a wall close to the coordinator, that is, a wall distant from the coordinator by a/2 is $D_a$ and the minimum network depth in which $r_n(D)$ exceeds a wall far from the coordinator, that is, a wall distant from the coordinator by b/2 is $D_b$, the coordinator may calculate $D_a$ and $D_b$ through [Equation 7] and [Equation 8] below (S130b), respectively.

$$D_a = \min\left\{D \,\middle|\, r_n(D) \geq \frac{a}{2}\right\} \qquad \text{[Equation 7]}$$
$$= \left\lceil 1 - \sqrt{2} + \frac{a}{\sqrt{2}\,r_d} \right\rceil$$

$$D_b = \min\left\{D \,\middle|\, r_n(D) \geq \frac{b}{2}\right\} \qquad \text{[Equation 8]}$$
$$= \left\lceil 1 - \sqrt{2} + \frac{b}{\sqrt{2}\,r_d} \right\rceil$$

The coordinator may estimate $N_d(D)$ according to [Equation 9] below based on the calculated $D_a$ and $D_b$ (S140b).

[Equation 9]

$$N_d(D) = \begin{cases} \rho \pi r_n^2(D), & \text{for } D < D_a \\ \rho\left\{a\sqrt{r_n^2(D) - \frac{a^2}{4}} + r_n^2(D)\left[\pi - 2\cos^{-1}\left(\frac{a}{2r_n(D)}\right)\right]\right\}, & \text{for } D_a \leq D < D_b \\ \rho\left\{a\sqrt{r_n^2(D) - \frac{a^2}{4}} + b\sqrt{r_n^2(D) - \frac{b^2}{4}} + r_n^2(D)\left[\pi - 2\cos^{-1}\left(\frac{ar_d}{2r_n(D)}\right) - 2\cos^{-1}\left(\frac{br_d}{2r_n(D)}\right)\right]\right\}, & \text{for } D_b \leq D < D_{min} \\ \rho S, & \text{for } D \geq D_{min} \end{cases}$$

Figure 9C:
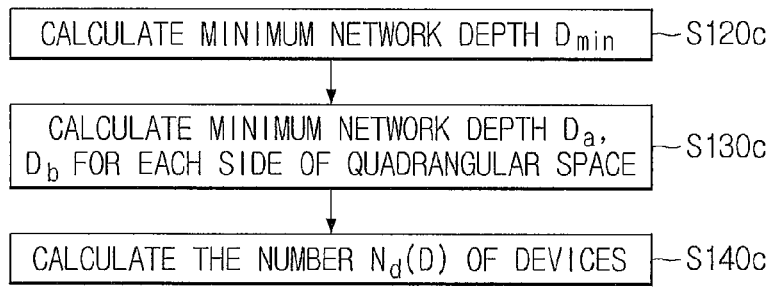

As the last example, FIG. 9(c) illustrates the process of estimating the minimum network depth $D_{min}$ and the number of devices $N_d(D)$ in the case in which the space is quadrangular and the coordinator is located at the corner, which is illustrated in FIG. 8(c), and in this case, the operating environment estimating unit 110 of the coordinator 100 estimates $D_{min}$ as described in [Equation 10] below (S120c), and calculates the minimum depth $D_a$ that satisfies $r_n(D) > a$ and the minimum depth $D_b$ that satisfies $r_n(D) > b$ as described in [Equation 11] and [Equation 12] below, respectively (S130c), and thereafter, the operating environment estimating unit 110 of the coordinator 100 may estimate $N_d(D)$ as described in [Equation 13] below based on the calculated $D_a$ and $D_b$ (S140c).

$$D_{min} = \min\{D \mid r_n(D) \geq \sqrt{a^2 + b^2}\} \quad \text{[Equation 10]}$$
$$= \left\lceil 1 - \sqrt{2} + \frac{\sqrt{2(a^2 + b^2)}}{r_d} \right\rceil$$

$$D_a = \min\{D \mid r_n(D) \geq a\} \quad \text{[Equation 11]}$$
$$= \left\lceil 1 - \sqrt{2} + \frac{\sqrt{2}\,a}{r_d} \right\rceil$$

$$D_b = \min\{D \mid r_n(D) \geq b\} \quad \text{[Equation 12]}$$
$$= \left\lceil 1 - \sqrt{2} + \frac{\sqrt{2}\,b}{r_d} \right\rceil$$

$$N_d(D) = \quad \text{[Equation 13]}$$

$$\begin{cases} \rho \pi r_n^2(D), & \text{for } D < D_a \\ \rho \left\{ 2a\sqrt{r_n^2(D) - a^2} + r_n^2(D)\left[\pi - 2\cos^{-1}\left(\frac{a}{r_n(D)}\right)\right] \right\}, & \text{for } D_a \leq D < D_b \\ \rho \left\{ 2a\sqrt{r_n^2(D) - a^2} + 2b\sqrt{r_n^2(D) - b^2} + r_n^2(D)\left[\pi - 2\cos^{-1}\left(\frac{ar_d}{r_n(D)}\right) - 2\cos^{-1}\left(\frac{br_d}{r_n(D)}\right)\right] \right\}, & \text{for } D_b \leq D < D_{min} \\ \rho S, & \text{for } D \geq D_{min} \end{cases}$$

Figure 10:
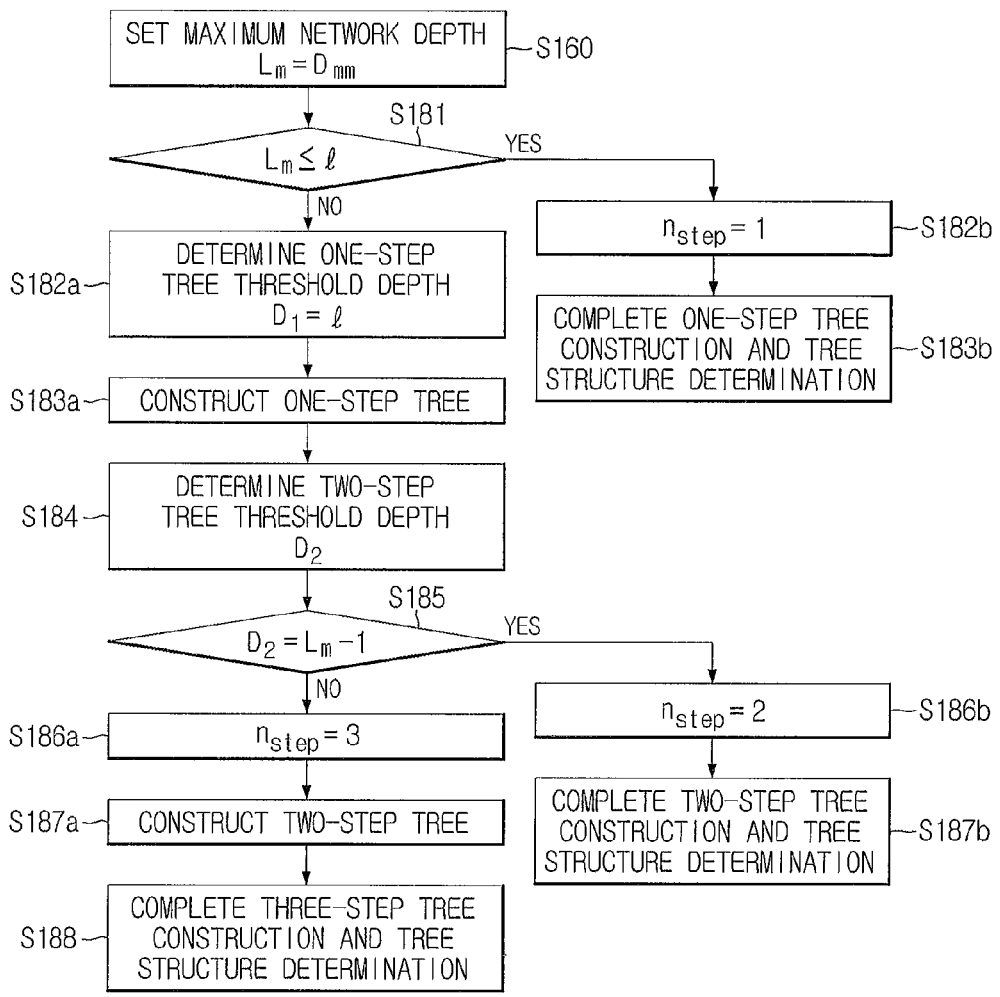
FIG. 10 illustrates a flowchart of an exemplary embodiment of a process for configuring a multi-step tree according to the present invention.

In the network structure determination process (S100) according to the exemplary embodiment of the present invention, the multi-step balanced-tree optimizing unit 120 of the coordinator 100 determines a maximum network depth $L_m$ so as to minimize a routing delay while covering up the entire area by using $D_{min}$ estimated by the operating environment estimating unit 110 of the coordinator 100 and optimizes the maximum number of child devices and the maximum number of child router devices according to the number of tree steps $n_{step}$ ($\leq N_{step}$) and the network depth so as to minimize a difference between the $N_d(D)$ and the number of devices which may be connected in the tree structure at the network depth D by using the $N_d(D)$ to thereby construct a multi-step tree suitable for device distribution, and FIG. 10 illustrates a flowchart of the process of configuring the multi-step tree.

In the multi-step tree structure, as the number of tree steps increases, the tree structure and actual device distribution are the same as each other, but a large amount of memory is used to store tree structure information, and as a result, the multi-step tree structure is not suitable for implementing the WSN. Therefore, a case of performing the multi-step tree structure determining process after determining the maximum number of tree steps $N_{step}$ as 3 is considered in the flowchart of the exemplary embodiment according to the present invention in FIG. 10. However, limiting the maximum number of tree steps $N_{step}$ to 3 is one exemplary embodiment according to the present invention and actually, in the present invention, the maximum number of tree steps $N_{step}$ may be determined without being limited thereto.

The process of configuring the multi-step tree according to the present invention is described with reference to FIG. 10. First, the multi-step balanced-tree optimizing unit 120 of the coordinator 100 sets the maximum network depth $L_m$ as $D_{min}$ so as to connect the entire area while minimizing the routing delay (S160).

In addition, in a case in which $L_m$ is equal to or smaller than a threshold value 1 (S181), that is, a case in which a large network depth is not required, it is judged that all devices may be connected by one-step tree and $n_{step}=1$ (S182b) and thereafter, $R_m(D)$ and $C_m(D)$ are determined according to [Equation 14], [Equation 15], and [Equation 16] below, respectively (S183b) to construct the one-step tree and terminate the tree optimizing process. However, actually, it is difficult for the one-step tree to support the large network depth due to a characteristic of the balanced-tree structure in which a required address space according to the network depth is exponentially increased with a value of $R_m(D)$.

$$R_m = \max\{R \mid R \leq R_{m,max}, G(L_m + 1, R) < N_{FFD}\} \quad \text{[Equation 14]}$$

$$C_m = \min\left\{C_{m,max}, \left\lfloor \frac{2^B - 1}{G(L_m, R_m)} \right\rfloor\right\} \quad \text{[Equation 15]}$$

$$(R_m(D), C_m(D)) = (R_m, C_m), \text{ for } 0 \leq D < L_m \quad \text{[Equation 16]}$$

Herein, $R_{m,max}$ and $C_{m,max}$ represent maximum values of $R_m(D)$ and $C_m(D)$, respectively, B represents the number of bits used for address allocation, $\lfloor x \rfloor$ represents a maximum value among integers which are equal to or smaller than x, and G(x,y) represents a function described in [Equation 17] below.

$$G(x, y) = \begin{cases} x - 1, & \text{for } x = 1 \\ \dfrac{y^{x-1} - 1}{y - 1}, & \text{otherwise} \end{cases} \quad \text{[Equation 17]}$$

However, if $L_m > 1$ (S181), it is judged that it is difficult to connect all of the devices by the one-step tree and configuring a multi-step tree of two steps or more starts, and first, a one-step tree threshold depth $D_1$ is determined as 1 (S182a) and $R_m(D)$ and $C_m(D)$ are determined according to [Equation 18], [Equation 19], and [Equation 20] below (S183a) and configuring the one-step tree ends.

$$R_{m1} = \max\left\{\begin{array}{l} R \mid R \leq R_{m,max}, 1 + RG(D_1, R) + \\ R^{D_1} G(L_m - D_1, R) < N_{FFD} \end{array}\right\} \quad \text{[Equation 18]}$$

$$C_{m1} = \min\left\{C_{m,max}, \left\lceil \frac{N_d(D_1 - 1) - 1}{G(D_1, R_{m1})} \right\rceil\right\} \quad \text{[Equation 19]}$$

$$(R_m(D), C_m(D)) = (R_{m1}, C_{m1}), \text{ for } 0 \leq D < D_1 \quad \text{[Equation 20]}$$

Thereafter, a two-step tree threshold depth $D_2$ is determined according to [Equation 21] below in order to construct the two-step tree (S184).

$$D_2 = 1 + \arg\max_{D_1 < D < L_m} \left\{ \frac{N_d(D) - 1 - C_{m1} G(D_1, R_{m1})}{D - D_1} \right\} \quad \text{[Equation 21]}$$

In addition, when the calculated two-step tree threshold depth $D_2$ is $D_2 = L_m - 1$ (S185), $n_{step}=2$ (S186b) and thereafter, $R_{m2}=1$ and $R_m(D)$ and $C_m(D)$ are determined according to [Equation 22] and [Equation 23] below (S187b) to construct the two-step tree.

$$C_{m2} = \min\left\{C_{m,max}, \left\lceil \frac{2^B - 1 - C_{m1}G(D_1, R_{m1})}{R_{m1}^{D_1} G(L_m - D_1, R_{m2})} \right\rceil \right\}$$ [Equation 22]

$$(R_m(D), C_m(D)) = (R_{m2}, C_{m2}), \text{ for } D_1 \le D < L_m$$ [Equation 23]

However, if $D_2 < L_m - 1$ (S174), $n_{step} = 3$ (S186a) and thereafter, $R_{m2} = 1$ and $C_{m2}$ is calculated by [Equation 24] below and $R_m(D)$ and $C_m(D)$ are determined according to [Equation 23] above (S187a) to construct the two-step tree.

$$C_{m2} = \min\left\{C_{m,max}, \left\lceil \frac{N_d(D_2 - 1) - 1 - C_{m1}G(D_1, R_{m1})}{R_{m1}^{D_1} G(D_2 - D_1, R_{m2})} \right\rceil \right\}$$ [Equation 24]

Thereafter, $R_{m3} = 1$, and $R_m(D)$ and $C_m(D)$ are determined according to [Equation 25] and [Equation 26] below (S188) to construct a three-step tree and terminate the tree optimizing process.

$$C_{m3} = \min\left\{C_{m,max}, \left\lceil \frac{2^B - 1 - C_{m1}G(D_1, R_{m1}) - R_{m1}^{D_1} C_{m2}G(D_2 - D_1, R_{m2})}{R_{m1}^{D_1} R_{m2}^{D_2-D_1} G(L_m - D_2, R_{m3})} \right\rceil \right\}$$ [Equation 25]

$$(R_m(D), C_m(D)) = (R_{m3}, C_{m3}), \text{ for } D_1 \le D < L_m$$ [Equation 26]

As such, the operating environment estimating unit 110 of the coordinator 100 according to the present invention estimates the $D_{min}$ and $N_d(D)$, and the multi-step tree optimizing unit 120 optimizes the multi-step tree in accordance with an actual device installation environment to design a network structure capable of connecting all of the devices while minimizing the routing delay.

Hereinafter, the network connection process (S200) will be described in more detail in FIG. 4 according to the exemplary embodiment of the present invention.

Figure 11:
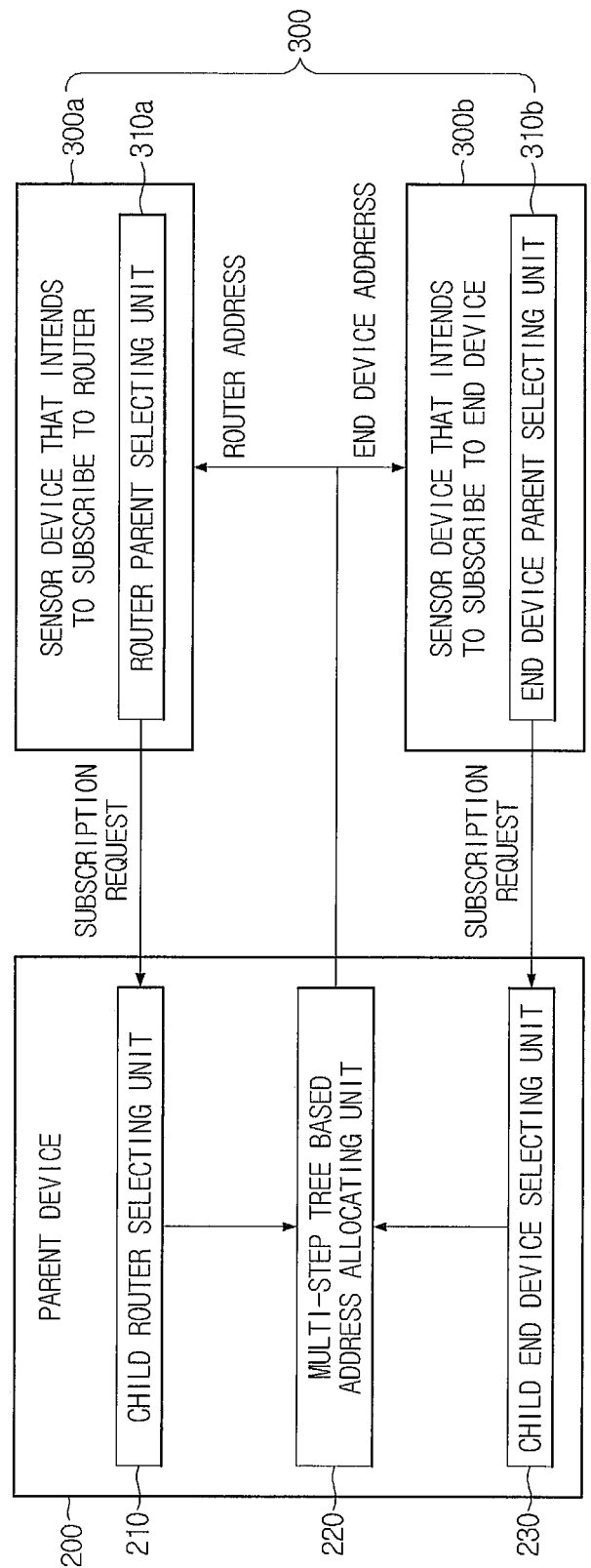
FIG. 11 illustrates a schematic configuration of an exemplary embodiment of a parent device and a child device according to the present invention.

FIG. 11 illustrates a schematic configuration of an exemplary embodiment of a parent device and a child device according to the present invention.

As illustrated in FIG. 11, a parent device 200 includes a child router selecting unit 210, a multi-step tree based address allocating unit 220, and a child end device selecting unit 230, and a child device 300 is generally divided into a child router device 300a which is a sensor device that intends to subscribe to a router and a child end device 300b which is a sensor device that intends to subscribe to an end device, the sensor device 300a that intends to subscribe to the router includes a router parent selecting unit 310a, and the sensor device 300b that intends to subscribe to the end device includes an end device parent selecting unit 310b.

The process of the network connection of the parent device and the child device (S200) will be described in more detail by referring back to FIG. 4. In the process of selecting a parent and a child (S210), first, the device 300a that intends to subscribe to the router among the child devices 300 selects a parent candidate group by using the network depth by the router parent selecting unit 310a, selects the parent device from the parent candidate group by using the network depth and channel status information such as a transmission link quality (link quality: LQ) and requests a subscription, and the selected parent device 200 selects the child router device by considering the number of parent candidates of devices that request the subscription by the child router selecting unit 210.

In addition, a device 300b that intends to subscribe to the end device among the child devices 300 selects the parent by using the network depth and the channel status information such as the transmission link quality (LQ) by the end device parent selecting unit 310b and thereafter, requests the subscription, and the selected parent device 300 selects a child end device in the order of arrival in the child end device selecting unit 230.

Preferably, in the exemplary embodiment of the present invention, the full function device first attempts to subscribe to the router and thereafter, when the full function device fails, the full function device may attempt to subscribe in the end device again and the reduced-functioning device may network-subscribe to only the end device.

Thereafter, the parent device 200 allocates an address of the child device through the multi-step tree based address allocating unit 220 (S230) and transmits the allocated address information to the child device 300.

In addition, it is judged whether the child device 300 is the router (S250) and when the child device 300 is the router, a superframe duration of a cluster to be afterwards constructed by a child router device is determined by using multiple channels (S270) and when the child device 300 is the end device, the network connection process (S200) ends immediately.

Figure 12:
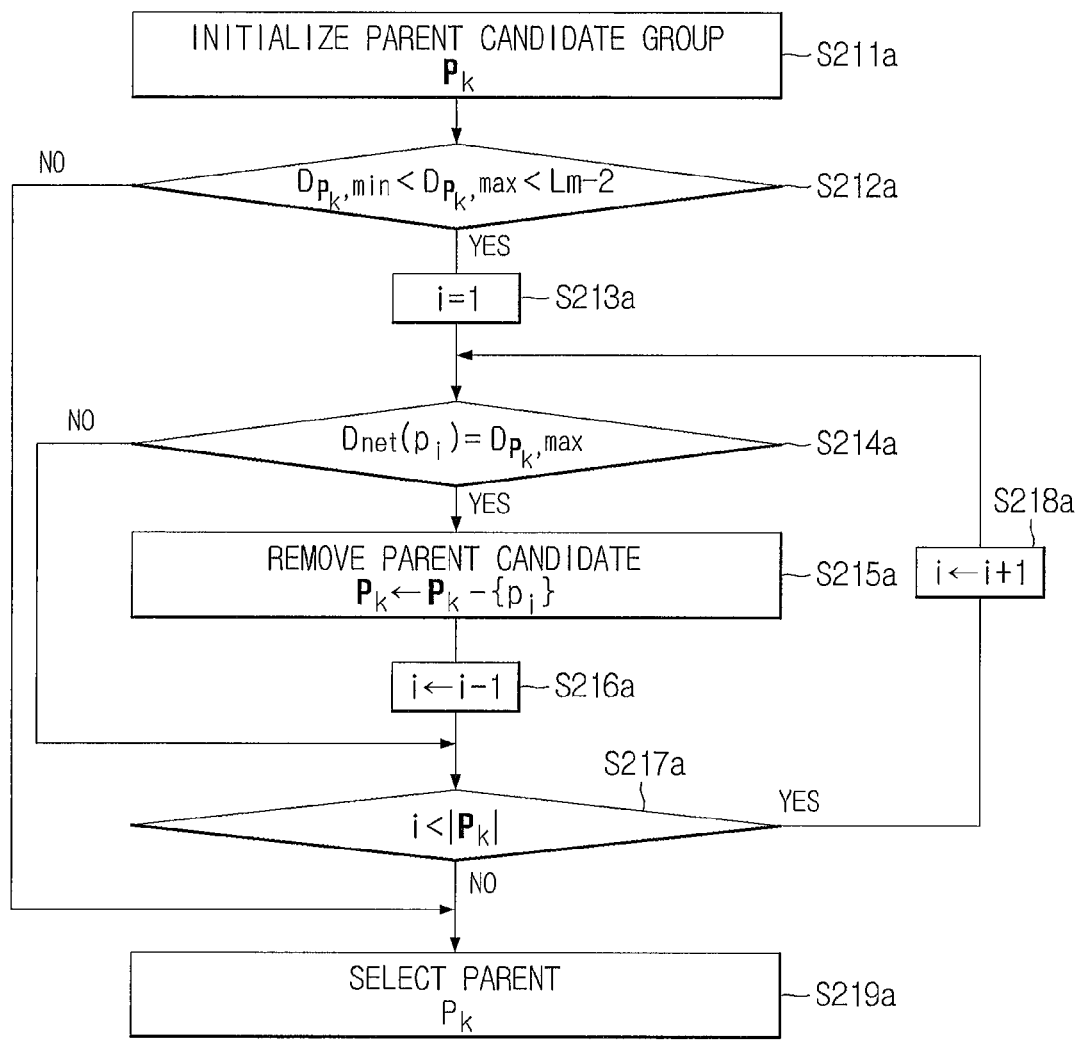
FIG. 12 illustrates a flowchart of an exemplary embodiment of a process in which a sensor device that intends to subscribe to a router is connected to the parent device according to the present invention.

Herein, a process in which the router parent selecting unit 310a of the sensor device 300a that intends to subscribe to the router selects the parent candidate group by using the network depth and selects the parent device from the parent candidate group by using the network depth and the channel status information such as the transmission link quality (LQ) is illustrated in a flowchart of FIG. 12.

The process in which the sensor device 300a that intends to subscribe to the router is connected to the parent device 200 according to the present invention will be described with reference to FIG. 12. The router parent selecting unit 310a of the sensor device k 300a that intends to subscribe to the router first estimates the transmission link quality (LQ) based on a receiving characteristic of beacon signals received through $N_{ch}$ channels and initializes the parent candidate group $P_k$ to routers in which the estimated transmission link quality (LQ) is larger than a threshold value δ for acquiring desired transmission performance as described in [Equation 27] below (S211a).

$$P_k = \{R \in R | \gamma(k, R) > \delta\}$$ [Equation 27]

Herein, R represents a set of all routers which are network-connected and $\gamma(d_1, d_2)$ represents the LQ between both devices $d_1$ and $d_2$.

In addition, $p_i$ is defined as an i-th parent candidate of $P_k$, $D_{net}(d)$ is defined as the network depth of the device d, $|P_k|$ is defined as the number of elements of $P_k$, and $D_{d,min}$ and $D_{d,max}$ are defined as described in [Equation 28] and [Equation 29] below.

$$D_{d,min} = \min_{d \in d}\{D_{net}(d)\}$$ [Equation 28]

$$D_{d,max} = \max_{d \in d}\{D_{net}(d)\}$$ [Equation 29]

If $D_{P_k,min} < D_{P_k,max} < L_m - 2$ (S212a), i=1 (S213a) and the parent candidate group is selected, and it is compared whether $D_{net}(p_i)$ and $D_{P_k,max}$ are the same as each other (S214a) and if $D_{net}(p_i) < D_{P_k,max}$, i and $|P_k|$ are immediately compared with each other (S217a) and if $D_{net}(p_i) = D_{P_k,max}$, the corresponding parent candidate is removed from the parent candidate group by setting $p_i$ as is $P_k \leftarrow P_k - \{p_i\}$ (S215a) and thereafter, i is decreased by 1 (S216a) and i and $|P_k|$ are compared with each other (S217a).

i and $|P_k|$ are compared with each other (S217a) and if $i < |P_k|$, i is increased by 1 (S218a) and thereafter, it is compared whether $D_{net}(p_i)$ and $D_{P_k,max}$ are the same as each other again (S214a) and if $i \geq |P_k|$, the parent candidate group selecting process ends.

If the parent candidate group selecting process ends or $D_{P_k,min} < D_{P_k,max} < L_m - 2$ (S212a) is not established and $D_{P_k,max} \geq L_m - 2$ or $D_{P_k,max} \leq D_{P_k,min}$, the router parent selecting unit 310a determines a set of parent candidates in which the network depth is minimum, $\hat{P}_k$ in the selected parent candidate group according to [Equation 30] below and selects a parent candidate in which the transmission link quality (LQ) is smallest in $\hat{P}_k$ as the parent device $P_k$ according to [Equation 31] below.

$$\hat{P}_k = \{p \in P_k \mid D_{net}(p) = D_{P_k,min}\}$$ [Equation 30]

$$P_k = \underset{\hat{p} \in \hat{P}_k}{\operatorname{argmin}} \{\gamma(\hat{p}, k)\}$$ [Equation 31]

The sensor device k that intends to subscribe to the router transmits a subscription request message including the number of parent candidates, $|P_k|$ to the parent device $P_k$ 200 after the parent selecting process ends.

The router parent selecting unit 310a of the child device 300 according to the present invention prevents each device from selecting a device farther from the coordinator than each device as a parent device by using the network depth information to prevent the waste of the network depth and selects a device far from each device as the parent by considering the transmission link quality (LQ), and the like, thereby efficiently extending the WSN average communication range and the size of the network.

Figure 13:
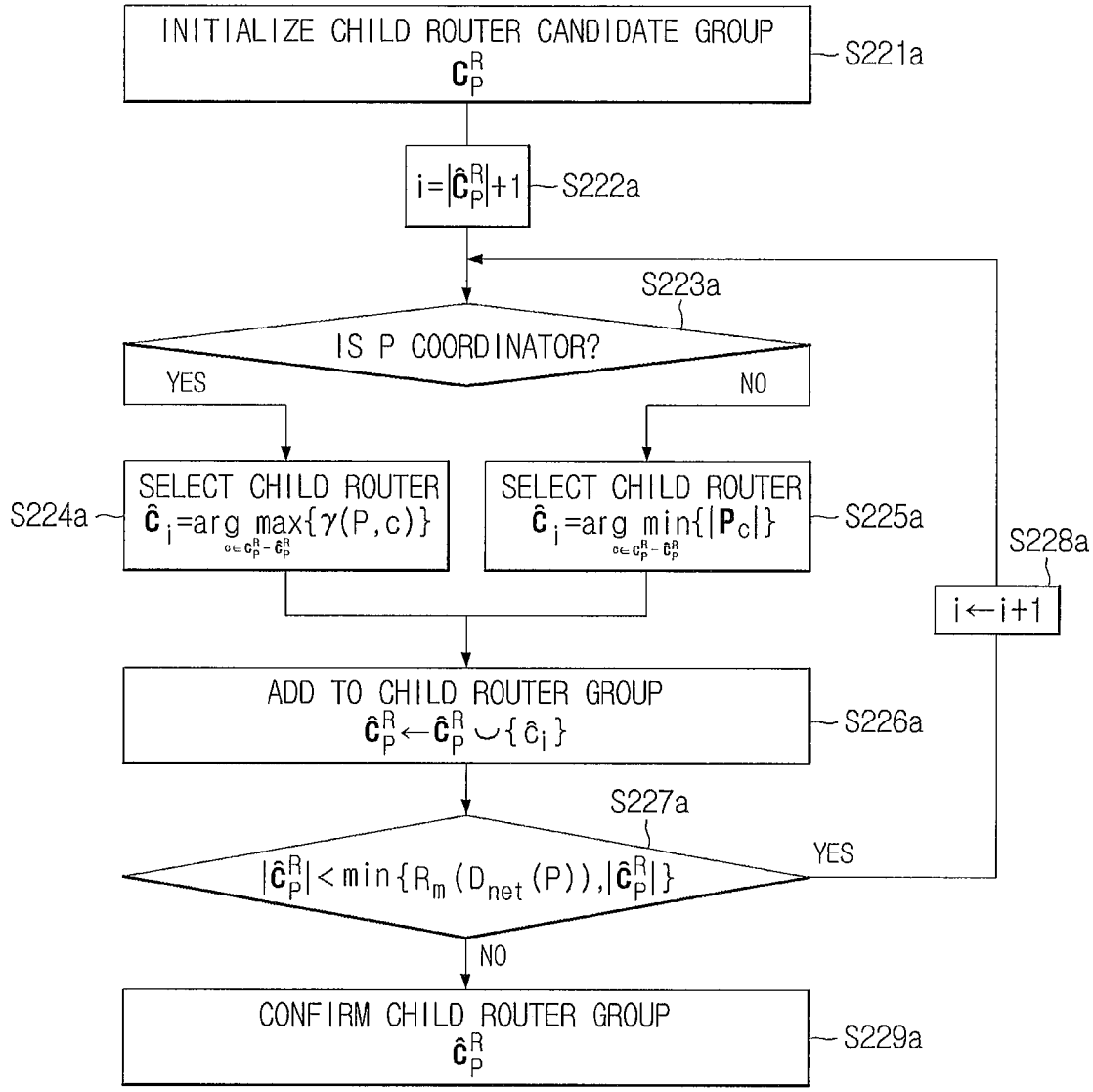
FIG. 13 illustrates a flowchart of an exemplary embodiment of a process in which the parent device selects a child router according to the present invention.

The parent device 200 selected by the router parent selecting unit 310a of the sensor device 300a that intends to subscribe to the router selects the child router device through the child router selecting unit 210. FIG. 13 is a flowchart illustrating a process in which the parent device selects the child router device.

A process in which the parent device 200 selects the child router device 300a by considering the transmission link quality (LQ) of the child router or the number of parent candidates through the child router selecting unit 210 will be described below with reference to FIG. 13. When the parent device 200 is represented by P and a child router candidate group and a child router group of the P are represented by $C_P^R$ and $\hat{C}_P^R$, respectively, the child router selecting unit 210 first initializes $C_P^R$ to devices that request network-subscription to the child router selecting unit 210 according to [Equation 32] below (S221a).

$$C_P^R = \{c \in C_P^R \mid P = P_c\}$$ [Equation 32]

Thereafter, $i = |\hat{C}_P^R| + 1$ is established (S222a) and it is judged whether the P is the coordinator (S223a) and when the P is the coordinator, a child router candidate in which the transmission link quality (LQ) is largest is selected as an i-th child router $\hat{c}_i$ according to [Equation 33] below (S224a) and when the P is the router, a child router candidate in which the number of parent candidates is smallest is selected as the i-th child router $\hat{c}_i$ as described in [Equation 34] below (S225a).

$$\hat{c}_i = \underset{c \in C_P^R - \hat{C}_P^R}{\operatorname{argmax}} \{\gamma(P, c)\}$$ [Equation 33]

$$\hat{c}_i = \underset{c \in C_P^R - \hat{C}_P^R}{\operatorname{argmin}} \{|P_c|\}$$ [Equation 34]

The child router information $\hat{c}_i$ selected through such a process is added to $\hat{C}_P^R$ (S226a) and $|\hat{C}_P^R|$ and $\min\{R_m(D_{net}(P)), |C_P^R|\}$ are compared with each other (S227a), and if $|\hat{C}_P^R| < \min\{R_m(D_{net}(P)), |C_P^R|\}$, $i \leftarrow i+1$ (S228a) and it is judged whether the P is the coordinator again (S223a) and if $|\hat{C}_P^R| \geq \min\{R_m(D_{net}(P)), |C_P^R|\}$, the child router group is confirmed as described in [Equation 35] below (S229a).

$$\hat{C}_P^R = \{\hat{c}_1, \hat{c}_2, K, \hat{c}_{|\hat{C}_P^R|}\}$$ [Equation 35]

When subscription of a device that intends to subscribe to the router is rejected by all parent candidates, the device reattempts to subscribe in the end device.

In the present invention, the coordinator or the child router selecting unit of the parent device is guided to be prevented from being concentrated on a specific direction and be evenly distributed in a wide area to maximize network connectivity and transmission performance.

Meanwhile, the sensor device 300b that intends to subscribe to the end device selects the parent device 200 by considering the network depth and the transmission link quality (LQ) through the end device parent selecting unit 310b and this case will be described with reference to FIG. 14.

Figure 14:
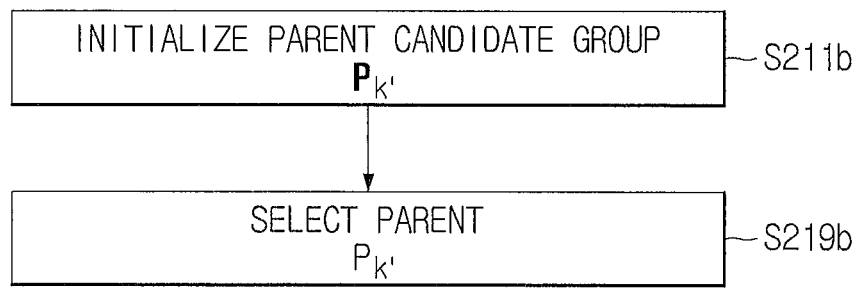
FIG. 14 illustrates an exemplary embodiment of a process in which the sensor device that intends to subscribe to an end device selects the parent device according to the present invention.

FIG. 14 illustrates a process in which the sensor device that intends to subscribe to the end device selects the parent device, and when the sensor device 300b that intends to subscribe to the end device is represented by k', the end device parent selecting unit 310b of the k' first estimates the transmission link quality (LQ) based on a receiving characteristic of beacon signals received through $N_{ch}$ channels and initializes the parent candidate group $P_{k'}$ to routers in which the estimated transmission link quality (LQ) is larger than δ as described in [Equation 36] below (S211b).

$$P_{k'} = \{R \in R \mid \gamma(k', R) > \delta\}$$ [Equation 36]

Thereafter, the set $\hat{P}_{k'}$ of the parent candidates in which the network depth is minimum in the parent candidate group is determined according to [Equation 37] below and the parent candidate in which the transmission link quality (LQ) is largest in the $\hat{P}_{k'}$ is selected as the parent $P_{k'}$ as described in [Equation 38] below (S219b) and thereafter, the parent selecting process ends.

$$\hat{P}_k = \{p \in P_k \mid D_{net}(p) = D_{P_k,min}\}$$ [Equation 37]

$$P_{k'} = \underset{\hat{p} \in \hat{P}_{k'}}{\operatorname{argmax}} \{\gamma(\hat{p}, n)\}$$ [Equation 38]

The child end device selecting unit 230 of the parent device $P_{k'}$ 200 selected through the end device parent selecting unit 310b selects the k' as the child end device to add the k' to $\hat{C}_{P_{k'}}^{ED}$ when the number of child end devices, $|\hat{C}_{P_{k'}}^{ED}|$ in a child end device group $\hat{C}_{P_{k'}}^{ED}$ is smaller than $C_m(D_{net}(P_{k'})) - R_m(D_{net}(P_{k'}))$, a value acquired by subtracting the maximum number of child routers, $R_m(D_{net}(P_{k'}))$ from the maximum number of child devices, $C_m(D_{net}(P_{k'}))$. That is, the child end device selecting unit 230 of the $P_{k'}$ selects the child end device within a limit of the maximum number of child end devices $C_m(D_{net}(P_{k'})) - R_m(D_{net}(P_{k'}))$ in the order of arrival.

As such, the network connectivity of the end device is improved and the transmission link quality (LQ) between the parent router and the child end device is ensured after network connection through the end device parent selecting unit 310b of the sensor device 300b that intends to subscribe to the end device and the child end device selecting unit 230 of the parent device 200 according to the present invention to thereby improve device-to-device data transmission performance.

Figure 15:
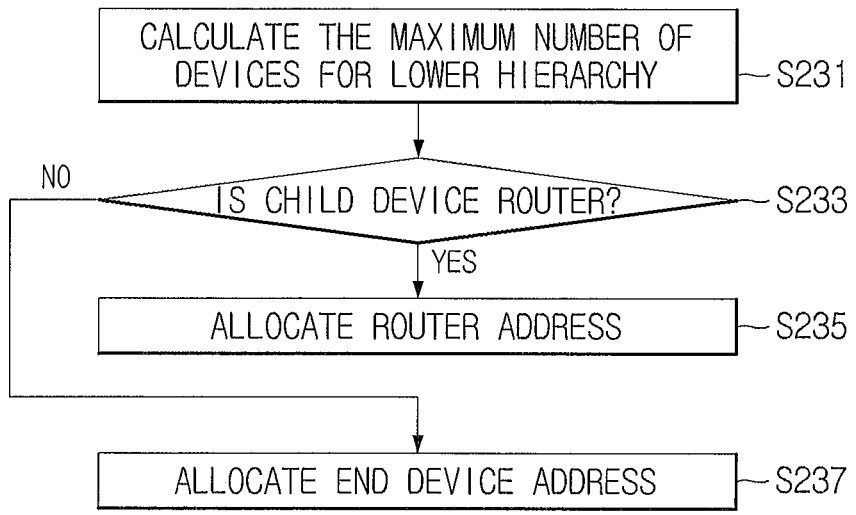
FIG. 15 illustrates a flowchart of a process in which the parent device allocates an address according to the present invention.

When the process of selecting the parent and the child (S210) ends, the multi-step tree based address allocating unit 220 of the parent device 200 may allocate the address to the child device 300 selected by the child router selecting unit 210 or the child end device selecting unit 230. FIG. 15 illustrates a flowchart for a process in which the parent device allocates an address according to the present invention.

Referring to FIG. 15, when the parent device 200 is represented by P, the P calculates the maximum number of devices, $C_{skip}(D_{net}(P))$ for a lower hierarchy of P in the multi-step tree structure in which the P may be connected to the network-based on a multi-step tree structure factor according to [Equation 39] below (S231).

$$C_{skip}(D_{net}(P)) = \begin{cases} 1 + C_m(D_{net}(P)) + \\ R_m(D_{net}(P))C_{skip}(D_{net}(P) + 1), & \text{for } 0 \le D_{net}(P) \le L_m - 1 \\ 0, & \text{for } D_{net}(P) = L_m \end{cases}$$ [Equation 39]

Thereafter, it is judged whether the child device 300 is the router (S233) and when the child device is the router, router addresses (total $R_m(D_{net}(P))$) are allocated at an interval of $C_{skip}(D_{net}(P))$ as described in [Equation 40] by considering the number of devices which may be connected to a lower hierarch tree step of the child router device (S235).

$$A_{R,n} = A_P + (n-1) \times C_{skip}(D_{net}(P)) + 1, \text{ for } 1 \le n \le R_m(D_{net}(P))$$ [Equation 40]

Herein, $A_P$ represents an address of the parent device and $A_{R,n}$ represents an address of an n-th child router device.

It is judged whether the child device 300 is the router (S233) and when the child device is the end device, child end device addresses (total $C_m(D_{net}(P)) - R_m(D_{net}(P))$) are allocated at an interval of 1 as described in [Equation 41] below (S237).

$$A_{ED,n} = A_P + R_m(d) \times C_{skip}(D_{net}(P)) + n, \text{ for } 1 \le n \le C_m(D_{net}(P)) - R_m(D_{net}(P))$$ [Equation 41]

Herein, $A_{ED,n}$ represents an address of an n-th child end device.

In the multi-step tree based address allocating process according to the present invention, each parent device calculates $C_{skip}(D_{net}(P))$ based on the multi-step tree structure factor determined in the network structure determining process (S100) and determines its own available address therethrough to assure independency of the address while the parent device directly allocates the address without separate message exchange.

Meanwhile, a process (S270) will be described, in which it is judged whether the child device is the router in FIG. 4 (S250) and when the child device is the router, the multiple channels are used and channel available state information of the parent device and the child router device is combined to allocate the superframe duration of the cluster to be afterwards constructed by the child router device.

Figure 16:
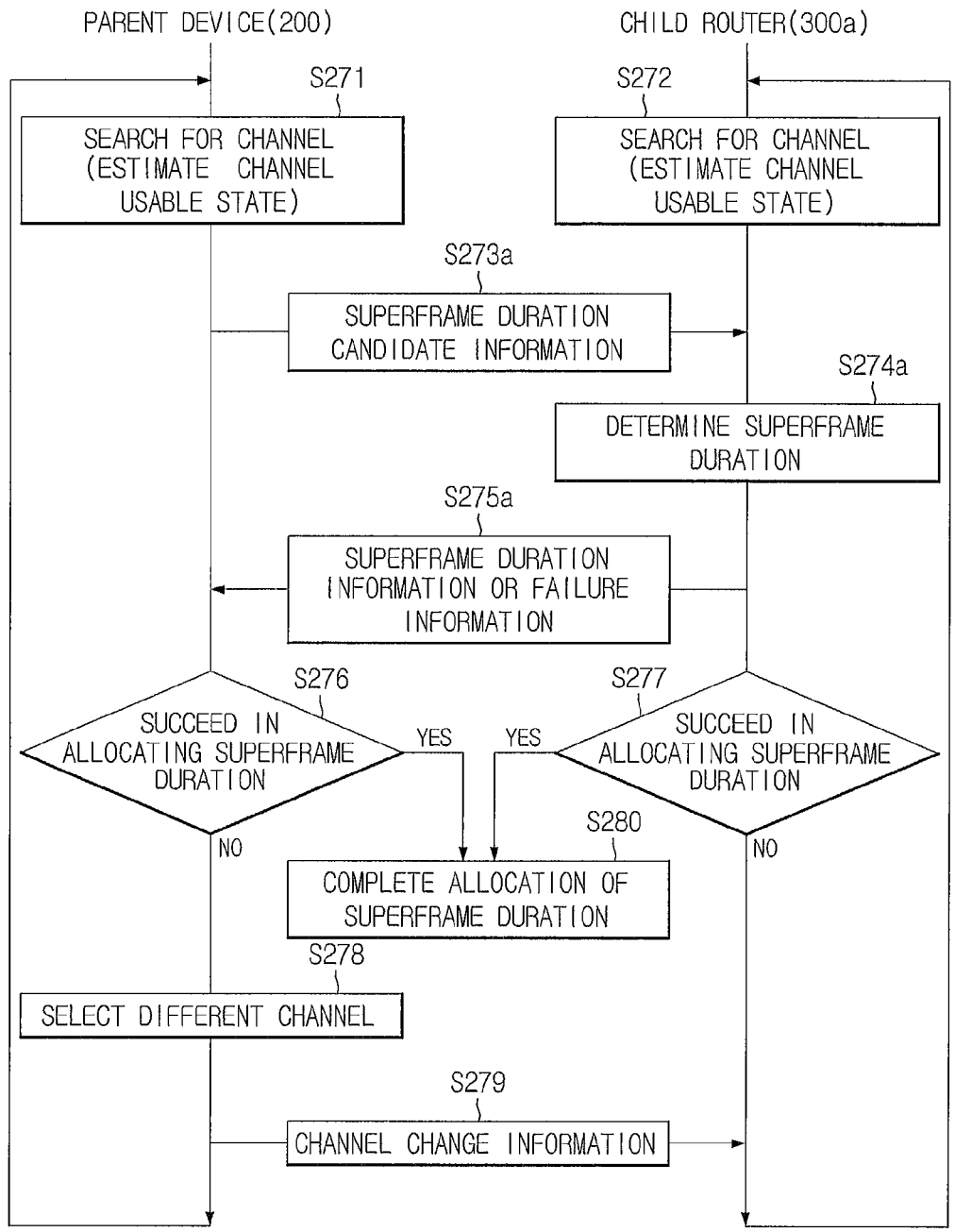
FIG. 16 illustrates a flowchart of an exemplary embodiment of a process of allocating a superframe duration of the child router according to the present invention.

FIG. 16 illustrates a flowchart of an exemplary embodiment for the process of allocating the superframe duration of the child router device in the present invention, and the process of allocating the superframe duration of the child router device will be described below with reference to FIG. 16. First, the parent device 200 and the child router device 300a transmit and receive address allocation information and thereafter, search for a channel of the parent device 200 during an inactivated period to estimate an available state of the channel (S271 and S272).

Thereafter, the parent device 200 prepares candidate information available as the superframe duration by using channel available state information estimated by the parent device 200 and for example, when duration Nos. 2, 5, and 7 among eight durations are vacant, the corresponding candidate information becomes 01001010 and the parent device 200 transmits the prepared candidate information available as the superframe duration to the child router device 300a (S273a). In addition, when the child router device 300a receives the superframe duration candidate information, the child router device 300a compares the superframe duration candidate information with the channel available state information estimated by the child router device 300a to determine one among the available durations as the superframe duration (S274a), and transmits the determined superframe duration information to the parent device 200 (S275a), and the parent device 200 and the child router device 300a complete allocation of the superframe duration (S280).

When the channel is saturated and thus, the superframe duration is not found during the superframe duration determining process (S274a), the child router device 300a transmits failure information to the parent device 200 (S275a) and in this case, the parent device 200 and the child router device 300a are switched over to a multi-channel operating mode so as for the child router device 300a to use the superframe duration in a different channel from the parent device 200.

The parent device 200 selects a different channel in the multi-channel operating mode (S278) and for example, when there is search information for the different channel previously, the parent device 200 selects a channel in which interference is smallest and when there is no information, the parent device 200 selects the channel arbitrarily or sequentially from channel No. 1. In addition, the parent device 200 transmits the channel change information to the child router device 300a (S279), estimates the available state of the channel again (S271), and repeats the superframe duration allocating process (S270) of searching for the channel first of all.

Meanwhile, the child router device 300a that receives the channel change information from the parent device 200 (S279) and receives the selected different channel information estimates the available state of the channel again (S272) and repeats the superframe duration allocating process (S270) of searching for the selected different channel first of all.

When the allocation of the superframe duration ends through the process, the child router device 300a transmits its own beacon signal in the superframe duration and selects new devices as the child device to construct the cluster.

Figure 17:
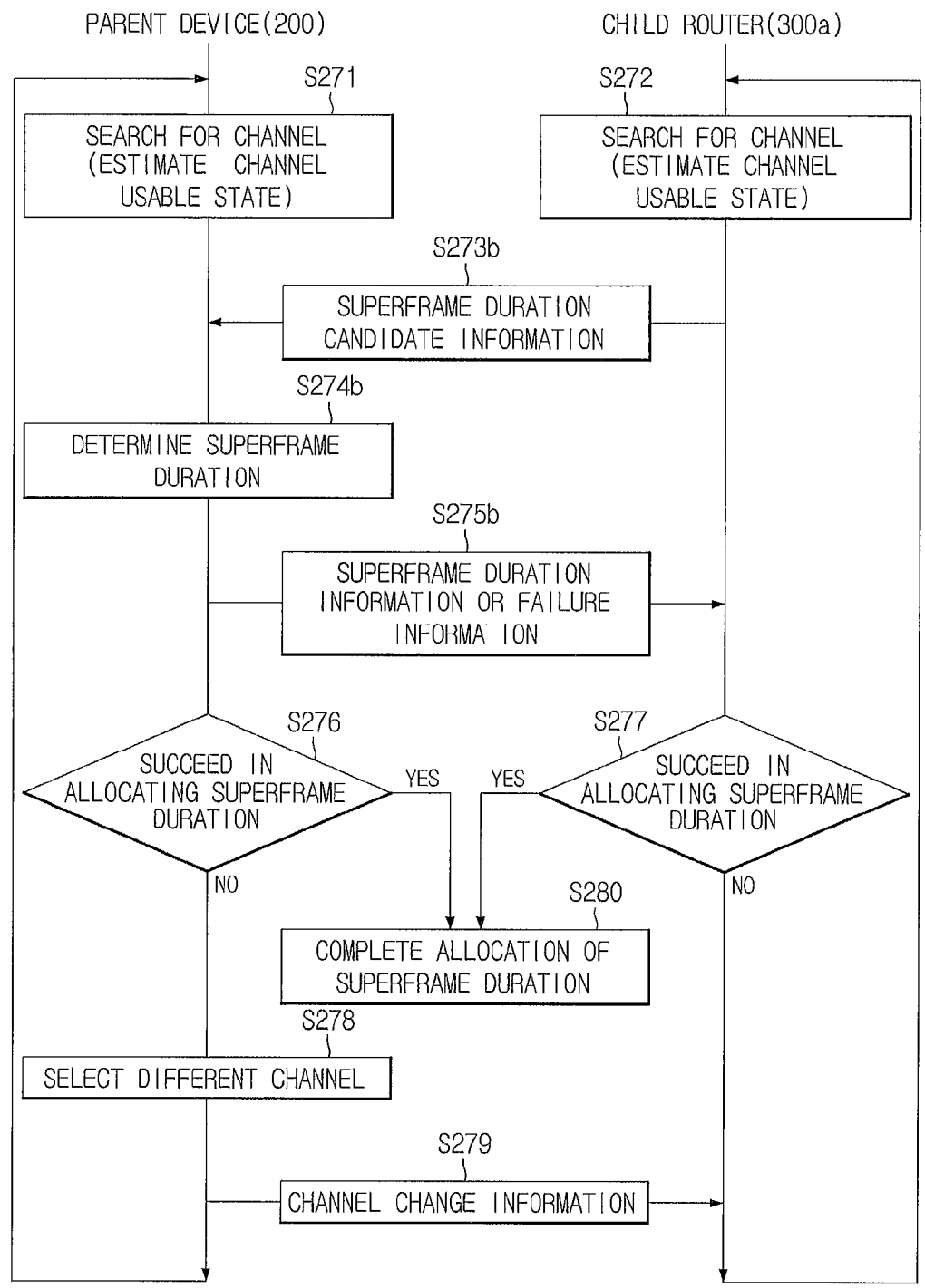
FIG. 17 illustrates a flowchart of another exemplary embodiment of the process of allocating the superframe duration of the child router according to the present invention.

FIG. 17 illustrates a flowchart of another exemplary embodiment for the process of allocating the superframe duration of the child router device in the present invention, and the process of allocating the superframe duration of the child router device will be described below with reference to FIG. 17. First, each of the parent device 200 and the child router device 300a transmits and receives the address allocation information and thereafter, searches for the channel of the parent device 200 during the inactivated period to estimate the available state of the channel similarly to the exemplary embodiment of FIG. 16 (S271 and S272).

Thereafter, in the exemplary embodiment illustrated in FIG. 17, the child router device 300a prepares candidate information available as the superframe duration by using channel available state information estimated by the child router device 300a differently from the exemplary embodiment of FIG. 16. In addition, the child router device 300a transmits the candidate information available as the superframe duration to the parent device 200 (S273b).

The parent device 200 that receives the superframe duration candidate information compares the superframe duration candidate information with the channel available state information estimated by the parent device 200 to determine one among the available durations as the superframe duration (S274b), and transmits the determined superframe duration information to the child router device 300a (S275b), and the parent device 200 and the child router device 300a complete the allocation of the superframe duration (S280).

When the channel is saturated and thus, the superframe duration is not found during the superframe duration determining process (S274b), the parent device 200 transmits failure information to the child router device 300a (S275b) and in this case, the parent device 200 and the child router device 300a are switched over to the multi-channel operating mode so as for the child router device 300a to use the superframe duration in the different channel from the parent device 200.

The parent device 200 selects a different channel in the multi-channel operating mode (S278) and for example, when there is search information for the different channel previously, the parent device 200 selects a channel in which interference is smallest and when there is no information, the parent device 200 selects the channel arbitrarily or sequentially from channel No. 1. In addition, the parent device 200 transmits the channel change information to the child router device 300a (S279), estimates the available state of the channel again (S271), and repeats the superframe duration allocating process (S270) of searching for the channel first of all.

Meanwhile, the child router device 300a that receives the channel change information from the parent device 200 (S279) and receives the selected different channel information estimates the available state of the channel again (S272) and repeats the superframe duration allocating process (S270) of searching for the selected different channel first of all.

When the allocation of the superframe duration ends through the process, the child router device 300a transmits its own beacon signal in the superframe duration and selects new devices as the child device to construct the cluster.

As described above, in the exemplary embodiment for the superframe duration allocating process illustrated in FIGS. 16 and 17, each of the parent device and the child router device searches for the channel state and thereafter, the child router device finally selects the superframe duration with respect to the superframe duration candidate information presented by the parent device or the parent device finally selects the superframe duration with respect to the superframe duration candidate information presented by the child router device, and as a result, the channel available state information of the parent device and the channel available state information of the child router device are efficiently combined to allocate the superframe duration. Further, unlike the existing Zigbee using a single channel, since the child router device uses a different channel from the parent device to allocate the superframe duration and operate its own cluster, each cluster ensures an independent superframe duration to connect the network without cluster-to-cluster interference even under an environment in which the devices are distributed with high density.

Hereinafter, an operating principle of the data transmitting process (S200) in FIG. 4 according to the exemplary embodiment of the present invention will be described.

Figure 18:
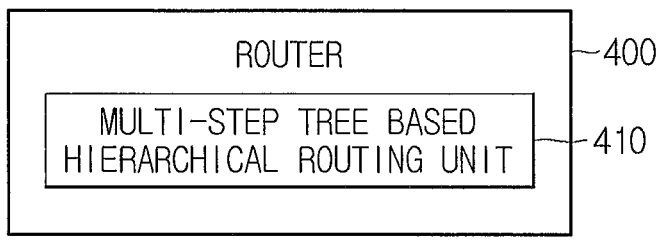
FIG. 18 illustrates an exemplary embodiment of a device that performs data transmission process according to the present invention.

FIG. 18 illustrates an exemplary embodiment of a device that performs the data transmitting process according to the present invention, and in the present invention, the data transmitting process (S300) is performed by a multi-step tree based hierarchical routing unit 410 of a router 400.

Figure 19:
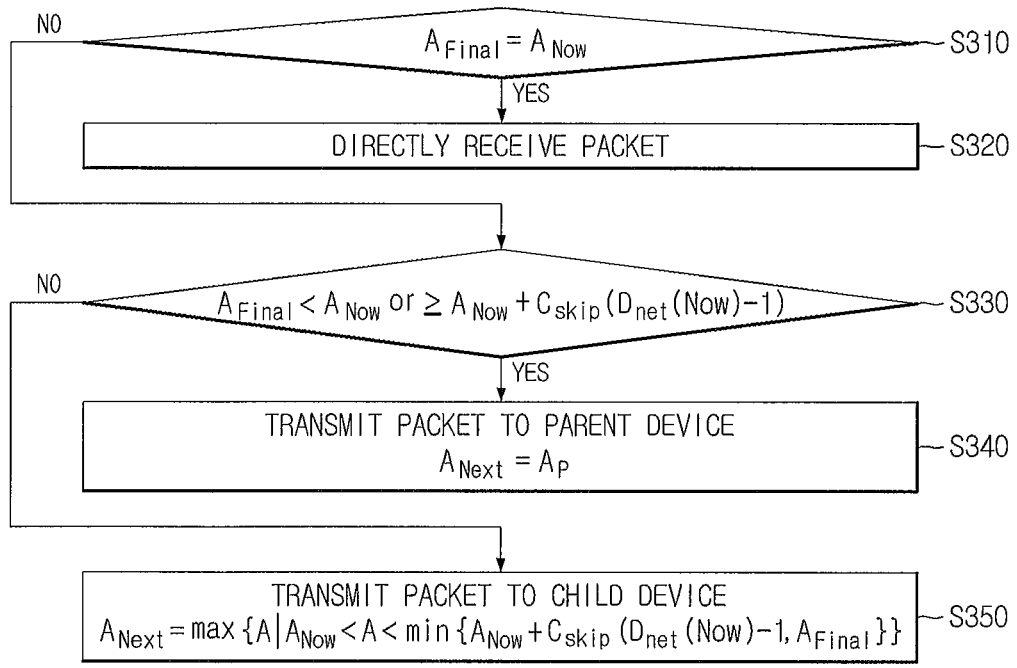
FIG. 19 illustrates a flowchart of an exemplary embodiment of a process for hierarchically searching for a routing path based on a multi-step tree structure according to the present invention.

A process in which the multi-step tree based hierarchical routing unit 410 hierarchically searches for a routing path based on the multi-step tree structure determined through the aforementioned process is illustrated in FIG. 19.

First, a router that has a packet at present is defined as Now, a next destination device of the packet is defined as Next, and a final destination device of the packet is defined as Final.

An address $A_{Now}$ of the router that has the packet at present and an address $A_{Final}$ of the final destination of the packet are compared with each other and if $A_{Final}=A_{Now}$ (S310), the router that has the packet at present by itself receives the packet (S320) and if $A_{Final} \neq A_{Now}$, the router starts searching for the routing path and if $A_{Final}<A_{Now}$ or $A_{Final} \geq A_{Now}+C_{skip}(D_{net}(Now)-1)$ (S330), the router judges that the Final device which is the final destination of the packet does not belong to a lower hierarchy than that of the router in the multi-step tree structure, establishes $A_{Next}=A_P$, and transmits the packet to its parent device P, that is, an upper hierarchy of the multi-step tree structure (S340). If $A_{Now}<A_{Final}<A_{Now}+C_{skip}(D_{net}(Now)-1)<$, the router Now that has the packet at present judges that the Final device which is the final destination of the packet belongs to the lower hierarchy than that of the router in the multi-step tree structure and determines an address of an appropriate child device as $A_{Next}$ as described in [Equation 42] below and thereafter, transmits the packet (S350).

$$A_{Next}=\max\{A|A_{Now}<A<\min\{A_{Now}+C_{skip}(D_{net}(Now)-1),A_{Final}\}\} \qquad \text{[Equation 42]}$$

Since the multi-step tree based hierarchical routing unit 410 determines the routing path of the packet based on the multi-step tree determined according to the network structure determining process (S100), there is no burden of searching for a separate routing path and a plurality of devices installed in the wide area with high density may be rapidly self-constructed while minimizing the message exchange and the routing delay.

As such, according to the present invention, a large number of devices selected with high density in the wide area are connected to the network while minimizing the message exchange caused during the process of self-construction of the WSN to thereby effectively improve large-scale WSN self-construction performance.

While the spirit of the present invention has been just described in the above exemplary embodiments of the present invention, those skilled in the art may change, modify, and substitute the exemplary embodiments of the present invention in various ways without departing from the essential characteristic of the present invention. Accordingly, the disclosed exemplary embodiments should be construed as not limiting but describing the technical spirit of the present invention, but the technical spirit of the present invention is not limited by the exemplary embodiments. The protection scope of the present invention should be interpreted based on the following appended claims and it should be appreciated that all technical spirits included within a range equivalent thereto are included in the appended claims of the present invention.

The invention claimed is:

1. A method for self-construction of a cluster tree structure based wireless sensor network (WSN), comprising:
   (A) a network structure determination step of calculating, by a coordinator, which is one of parent devices, a minimum network depth for covering up the entire area of the WSN and the number of devices located within a communication range, and calculating a maximum number of child router devices and a maximum number of child end devices according to a network depth at each tree step to determine a network structure;
   (B) a network construction step of selecting, by the parent device at each tree step, the device as a child device with address allocation in response to a subscription request of a device as a child device, and allocating a superframe duration to a child router device among the child devices; and
   (C) a data transmission step of searching for, by a router device having data packets, a routing path by means of address comparison between its own address and a final destination address of the packet, and transmitting the packet according to the routing path,
   wherein step (A) includes:
   (A-1) calculating an average communication range and calculating the minimum network depth based on the average communication range;
   (A-2) calculating the number of devices located within the average communication range based on the average communication range and the minimum network depth;
   (A-3) determining a maximum network depth and the number of tree steps; and
   (A-4) calculating the maximum number of child router devices and the maximum number of child end devices according to the network depth at each tree step.

2. The method for self-construction of a cluster tree structure based wireless sensor network (WSN) of claim 1, wherein
   in step (A-3), the maximum network depth is set as the minimum network depth and the number of tree steps is input from a user or set to a previously determined value, and
   in step (A-4), a tree threshold depth is determined for each tree step, and a structure for each tree step is determined by calculating the maximum number of child router devices and the maximum number of child end devices at each tree step in consideration of the maximum network depth and the tree threshold depth.

3. The method for self-construction of a cluster tree structure based wireless sensor network (WSN) of claim 1, wherein step (B) includes:
   (B-1) selecting, by a child device, a parent candidate group, selecting a parent device in consideration of a network depth and a transmission link quality (LQ) of parent devices in the parent device candidate group, and requesting subscription to the selected parent device as a child device;
   (B-2) selecting, by the selected parent device, a child device that requests subscription in consideration of the number of its child devices and allowing the selected child device to subscribe as its child device;
   (B-3) allocating, by the selected parent device, an address to the selected child device; and
   (B-4) allocating, by the selected parent device, a superframe duration to its child router devices with address allocation.

4. The method for self-construction of a cluster tree structure based wireless sensor network (WSN) of claim 3, wherein when the child device is selected as a child router device, step (B-1) includes:
   estimating, by the child device, the transmission link quality (LQ) from reception characteristics of a received beacon signal and initializing a parent device candidate group comprising routers whose transmission link quality (LQ) is larger than a threshold value;
   determining a parent device candidate group in consideration of the network depth of parent devices in the parent device candidate group;
   selecting a parent device which has the lowest transmission link quality (LQ) in the parent device candidate group; and
   transmitting to the selected parent device a subscription request message including the number of parent devices in the parent device candidate group.

5. The method for self-construction of a cluster tree structure based wireless sensor network (WSN) of claim 4, wherein step (B-2) includes:
   initializing, by the selected parent device, its child router candidate group comprising devices that request subscription as one of its child routers;
   selecting a child router device which has the highest transmission link quality (LQ) among child router devices in the child router candidate group when the selected parent device is the coordinator, and selecting a child router device which has the smallest number of the parent devices in the parent device candidate group among child router devices in the child router candidate group when the selected parent device is the router;
   adding the selected child router device to its child router group; and
   confirming the subscription of the selected child router device in consideration of the number of child routers in its child router group and the maximum allowable number of child routers.

6. The method for self-construction of a cluster tree structure based wireless sensor network (WSN) of claim 3, wherein when the child device is selected as a child end device, step (B-1) includes:
   estimating, by the child device, the transmission link quality (LQ) based on reception characteristics of a received beacon signal and initializing a parent device candidate group comprising routers whose estimated transmission link quality (LQ) is larger than a threshold value;
   determining parent devices belonging to the parent device candidate group in consideration of their network depth;
   selecting a parent device which has the largest transmission link quality (LQ) in the parent device candidate group; and
   transmitting a subscription request message to the selected parent device.

7. The method for self-construction of a cluster tree structure based wireless sensor network (WSN) of claim 6, wherein in step (B-2),
   the selected parent device confirms the subscription of devices as its child end devices in a first-come-first-service manner in consideration of the maximum allowable number of child end devices which is equal to the difference between the maximum allowable number of its child devices and the maximum allowable number of its child router devices.

8. The method for self-construction of a cluster tree structure based wireless sensor network (WSN) of claim 5, wherein, when a device requesting subscription as a child router device is rejected by all of the parent devices in the parent device candidate group as a result of performing step (B-2), it performs step (B-1) as a child end device again.

9. The method for self-construction of a cluster tree structure based wireless sensor network (WSN) of claim 3, wherein step (B-3) includes:
Calculating, by the selected parent device, the maximum number of its child devices allowable at its lower hierarchical tree steps;
allocating its child router devices their address each of which is separated by a space of the maximum allowable number of their descendent child devices; and
allocating the address to its child end devices by increasing one by one from the largest address that its child routers use.

10. The method for self-construction of a cluster tree structure based wireless sensor network (WSN) of claim 3, wherein step (B-4) includes:
(B-4-a1) estimating, by the selected parent device and its child router device, the availability of a channel selected by the selected parent device by means of channel sensing;
(B-4-a2) generating, by the selected parent device, information on candidate superframe duration available in the estimated channel;
(B-4-a3) transmitting, by the selected parent device, the information on candidate superframe duration to its child router device;
(B-4-a4) determining, by the child router device, a superframe duration among candidate superframe durations in consideration of the received information on candidate superframe duration and available superframe duration estimated by itself;
(B-4-a5) transmitting, by the child router device, information on the determined superframe duration to the selected parent device; and
(B-4-a6) settling the superframe duration to be used by the selected parent device and its child router device.

11. The method for self-construction of a cluster tree structure based wireless sensor network (WSN) of claim 10, wherein step (B-4-a4) includes:
comparing, by the child router device, the received information on candidate superframe duration and its estimated available superframe duration, and transmitting to the selected parent device a failure message on the selection of superframe duration when no superframe duration is available; and
repeating, by the selected parent device, step (B-4-a1) by means of channel sensing on a different channel when the failure message is received.

12. The method for self-construction of a cluster tree structure based wireless sensor network (WSN) of claim 3, wherein step (B-4) includes:
(B-4-b1) estimating, by the selected parent device and its child router device, the availability of a channel selected by the selected parent device by means of channel sensing;
(B-4-b2) generating, by the child router device, information on candidate superframe duration available in the estimated channel;
(B-4-b3) transmitting, by the child router device, the information on candidate superframe duration to the selected parent device;
(B-4-b4) determining, by the selected parent device, a superframe duration among candidate superframe durations in consideration of the received information on candidate superframe duration and available superframe duration estimated by itself;
(B-4-b5) transmitting, by the selected parent device, the determined superframe duration information to the child router device; and
(B-4-b6) settling the superframe duration to be used by the selected parent device and the child router device.

13. The method for self-construction of a cluster tree structure based wireless sensor network (WSN) of claim 12, wherein step (B-4-b4) includes:
comparing, by the selected parent device, the received information on candidate superframe duration and available superframe duration estimated by itself, and transmitting to the child router device a failure message on the selection of superframe duration when no superframe duration is available; and
repeating, by the selected parent device, step (B-4-a1) by means of channel sensing on a different channel when the failure message is received.

14. The method for self-construction of a cluster tree structure based wireless sensor network (WSN) of claim 1, wherein step (C) includes:
receiving, by the router device having a packet, the packet when its address is the same as the final destination address of the packet;
transmitting the packet to its child devices when the final destination address of the packet is larger than its address and smaller than its address plus its maximum allowable number of its child devices; and
returning the packet to its parent device when the final destination address of the packet is smaller than its address or larger than its address plus its maximum allowable number of its child devices.

15. A system for self-construction of a cluster tree structure based wireless sensor network (WSN), comprising:
a coordinator calculating an average communication range of the WSN and the number of devices located within the average communication range and calculating the maximum allowable number of child routers and child devices at each tree step based on the average communication range and the number of devices within the average communication range to determine a multi-step tree network structure;
parent devices selecting their child devices through a subscription request from devices belonging to a lower hierarchical tree step, and allocating their selected child devices to their own child devices addresses; and
child devices having their own addresses allocated by a parent device belonging to an higher hierarchical tree step through a subscription request process,
wherein the child devices include child router devices and child end devices,
the child router device includes a router parent selecting unit that selects a parent device candidate group, selects a parent device in the parent device candidate group, and requests subscription to the selected parent device, and
the child end device includes an end device parent selecting unit that selects a parent device candidate group, selects the parent device from the parent device candidate group, and requests subscription to the selected parent device.

16. The system for self-construction of a cluster tree structure based wireless sensor network (WSN) of claim 15, wherein the coordinator includes:

an operating environment estimating unit calculating an average communication range and the number of devices located within the average communication range; and a multi-step balanced-tree structure optimizing unit calculating a maximum network depth, and the maximum allowable number of child routers and the maximum allowable number of child devices at each tree step.

17. The system for self-construction of a cluster tree structure based wireless sensor network (WSN) of claim 15, wherein the parent device includes:

a child router selecting unit determining its child router devices among devices that request subscription as a child router and managing its child router devices;

a child end device selecting unit determining its child end devices among devices that request subscription as a child end device and managing its child router devices; and a multi-step tree based address allocating unit allocating an address to each of its selected child devices, transmitting the allocated address to its selected child devices, and allocating a superframe duration to each of its child router devices.

18. The system for self-construction of a cluster tree structure based wireless sensor network (WSN) of claim 15, wherein the coordinator, the parent device, and the child router device include a multi-step tree based hierarchical routing unit that searches for a routing path for transmitting packets as a router device.

* * * * *